United States Patent
Maari

(10) Patent No.: US 7,245,937 B2
(45) Date of Patent: Jul. 17, 2007

(54) NETWORK SYSTEM, COMMUNICATION METHOD OF NETWORK SYSTEM, ELECTRONIC DEVICE, COMMUNICATION METHOD OF ELECTRONIC DEVICE, COMMUNICATION APPARATUS, COMMUNICATION METHOD OF COMMUNICATION APPARATUS, STORAGE MEDIUM, AND COMPUTER PROGRAM

(75) Inventor: Koichi Maari, Chiba (JP)

(73) Assignee: Sony Corporation, Tokyo (JP)

( * ) Notice: Subject to any disclaimer, the term of this patent is extended or adjusted under 35 U.S.C. 154(b) by 607 days.

(21) Appl. No.: 10/309,956

(22) Filed: Dec. 4, 2002

(65) Prior Publication Data

US 2003/0110512 A1 Jun. 12, 2003

(30) Foreign Application Priority Data

Dec. 6, 2001 (JP) ............................ P2001-372947

(51) Int. Cl.
*H04B 1/38* (2006.01)
(52) U.S. Cl. .................. 455/558; 455/556.1; 455/557; 235/380
(58) Field of Classification Search ................ 455/558, 455/556.1, 556.2, 557; 235/380
See application file for complete search history.

(56) References Cited

U.S. PATENT DOCUMENTS

| 6,601,093 | B1 * | 7/2003 | Peters ........................ 709/220 |
| 2002/0066029 | A1 * | 5/2002 | Yi ............................... 713/201 |
| 2002/0093915 | A1 * | 7/2002 | Larson ........................ 370/235 |
| 2002/0101848 | A1 * | 8/2002 | Lee et al. .................... 370/349 |
| 2004/0087339 | A1 * | 5/2004 | Goldthwaite et al. ....... 455/558 |
| 2004/0171369 | A1 * | 9/2004 | Little et al. ................. 455/410 |
| 2005/0203765 | A1 * | 9/2005 | Maritzen et al. ............... 705/1 |

FOREIGN PATENT DOCUMENTS

| JP | 2000-059357 | 2/2000 |
| JP | 10224079 | * 2/2000 |

* cited by examiner

*Primary Examiner*—Matthew Anderson
*Assistant Examiner*—Minh Dao
(74) *Attorney, Agent, or Firm*—Finnegan, Henderson, Farabow, Garrett & Dunner, L.L.P.

(57) ABSTRACT

When an IC card is placed close to an IC card reader/writer in a hard disk recorder, the hard disk recorder writes the profile thereof including an IP address on the IC card. The hard disk recorder reads a card ID and a profile list including, for example, the profile of a television receiver from the IC card. Based on the card ID and the profile list, the hard disk recorder accesses the television receiver. The hard disk recorder notifies the television receiver of the profile list which is read from the IC card and to which the profile of the hard disk recorder has been newly added. The hard disk recorder thus establishes a virtual private network with the television receiver.

12 Claims, 18 Drawing Sheets

FIG. 8

```
NETWORK ID   001

PROFILE
1.TELEVISION RECEIVER
     IP ADDRESS                    aaaa:aaaa:aaaa:aaaa
     HARDWARE CONFIGURATION        IEEE 802.11a
                                   COMMUNICATION MODULE
                                   MPEG 2 DECODER
```

FIG. 10

```
NETWORK ID    001

PROFILE

1. TELEVISION RECEIVER
     IP ADDRESS                    aaaa:aaaa:aaaa:aaaa
     HARDWARE CONFIGURATION        IEEE 802.11a
                                   COMMUNICATION MODULE
                                   MPEG 2 DECODER 2. HARD DISK RECORDER
     IP ADDRESS                    bbbb:bbbb:bbbb:bbbb
     HARDWARE CONFIGURATION        IEEE 802.11a
                                   COMMUNICATION MODULE
                                   MPEG 2 DECODER
```

FIG. 12

```
NETWORK ID    001

PROFILE

1. TELEVISION RECEIVER
     IP ADDRESS                  aaaa:aaaa:aaaa:aaaa
     HARDWARE CONFIGURATION      IEEE 802.11a
                                 COMMUNICATION MODULE
                                 MPEG 2 DECODER 2. HARD DISK RECORDER
     IP ADDRESS                  bbbb:bbbb:bbbb:bbbb
     HARDWARE CONFIGURATION      IEEE 802.11a
                                 COMMUNICATION MODULE
                                 MPEG 2 DECODER 3. PDA
     IP ADDRESS                  cccc:cccc:cccc:cccc
     HARDWARE CONFIGURATION      IEEE 802.11a
                                 COMMUNICATION MODULE
                                 MPEG 2 DECODER
```

NETWORK SYSTEM, COMMUNICATION METHOD OF NETWORK SYSTEM, ELECTRONIC DEVICE, COMMUNICATION METHOD OF ELECTRONIC DEVICE, COMMUNICATION APPARATUS, COMMUNICATION METHOD OF COMMUNICATION APPARATUS, STORAGE MEDIUM, AND COMPUTER PROGRAM

BACKGROUND OF THE INVENTION

1. Field of the Invention

The present invention relates to a network system, communication method of the network system, electronic device, communication method of the electronic device, communication apparatus, communication method of the communication apparatus, storage medium, and computer program, and, more particularly, to a network system, communication method of the network system, electronic device, communication method of the electronic device, communication apparatus, communication method of the communication apparatus, storage medium, and computer program for easily and quickly forming a private network.

2. Description of the Related Art

VPNs (Virtual Private Networks) are in widespread use as a security technique. The VPN provides a secure communication between points by establishing a dedicated line even if the Internet is used.

To communicate over the VPN, each point must be equipped with a dedicated device having a VPN function. The setting of the dedicated device is too complex for ordinary users to perform on their own.

Some of commercially available routers and firewalls are provided with the function of such a dedicated device. The routers and firewalls are equally complex to set.

SUMMARY OF THE INVENTION

Accordingly, it is an object of the present invention to allow users to easily and quickly establish a virtual private network.

The present invention relates to a network system and includes an electronic device and a communication apparatus and forms a virtual private network based on information stored in the electronic device. The electronic device includes a first receiver which receives first feature information transmitted from the communication apparatus and indicating a feature of the communication apparatus, a first storage unit which stores the first feature information received by the first receiver and second feature information indicating a feature of another communication apparatus, a second storage unit which stores identification information, and a first transmitter which transmits, to the communication apparatus which has transmitted the first feature information, the second feature information stored in the first storage unit and the identification information stored in the second storage unit. The communication apparatus includes a third storage unit which stores the first feature information, a second transmitter which transmits the first feature information stored in the third storage unit to the electronic device, a second receiver which receives the second feature information and the identification information transmitted from the electronic device, a third transmitter which establishes a connection with the other communication apparatus based on the second feature information received by the second receiver and transmits the first feature information to the other communication apparatus, and a forming unit which stores the second feature information and forms a virtual private network with the other communication apparatus.

The present invention relates to a communication method of a network system of the present invention including an electronic device and a communication apparatus and forming a virtual private network based on information stored in the electronic device. The communication method of the network system carried out by the electronic device includes a first receiving step of receiving first feature information transmitted from the communication apparatus and indicating a feature of the communication apparatus, a first storage step of storing the first feature information received in the first receiving step and second feature information indicating a feature of another communication apparatus, a second storage step of storing identification information, and a first transmitting step of transmitting, to the communication apparatus which has transmitted the first feature information, the second feature information stored in the first storage step and the identification information stored in the second storage step. The communication method of the network system carried out by the communication apparatus includes a third storage step of storing the first feature information, a second transmitting step of transmitting the first feature information stored in the third storage step to the electronic device, a second receiving step of receiving the second feature information and the identification information transmitted from the electronic device, a third transmitting step of transmitting the first feature information to the other communication apparatus which is connected to the communication apparatus based on the second feature information received in the second receiving step, and a forming step of forming a virtual private network with the other communication apparatus by storing the second feature information.

An electronic device of the present invention includes a receiver which receives first feature information transmitted from a communication apparatus and indicating a feature of the communication apparatus, a first storage unit which stores the first feature information received by the receiver and second feature information indicating a feature of another communication apparatus, a second storage unit which stores identification information, and a transmitter which transmits, to the communication apparatus which has transmitted the first feature information, the second feature information stored in the first storage unit and the identification information stored in the second storage unit.

Preferably, the first feature information includes an IP address of the communication apparatus, and the second feature information includes an IP address of the other communication apparatus.

Preferably, the second storage unit further stores image data which presents the same image on the communication apparatus and the other communication apparatus, and the transmitter further transmits the image data stored in the second storage unit.

Preferably, the second storage unit further stores an encryption key which is used in communication over a virtual private network including the communication apparatus and the other communication apparatus, and the transmitter further transmits the encryption key stored in the second storage unit.

A communication method of the present invention includes a receiving step of receiving first feature information transmitted from a communication apparatus and indicating a feature of the communication apparatus, a first storage step of storing the first feature information received in the receiving step and second feature information indicating a feature of another communication apparatus, a second storage step of storing identification information, and a transmitting step of transmitting, to the communication apparatus which has transmitted the first feature information, the second feature information stored in the first storage step and the identification information stored in the second storage step.

A storage medium of the present invention stores a computer readable program, which includes a reception control step of controlling the reception of first feature information transmitted from a communication apparatus and indicating a feature of the communication apparatus, a first acquisition control step of controlling of the acquisition of the stored first feature information received in the reception control step and stored second feature information indicating a feature of another communication apparatus, a second acquisition control step of controlling the acquisition of stored identification information, and a transmission control step of controlling the transmission of, to the communication apparatus which has transmitted the first feature information, the second feature information acquired in the first acquisition control step and the identification information acquired in the second acquisition control step.

A computer program of the present invention includes a reception control step of controlling the reception of first feature information transmitted from a communication apparatus and indicating a feature of the communication apparatus, a first acquisition control step of controlling of the acquisition of the stored first feature information received in the reception control step and stored second feature information indicating a feature of another communication apparatus, a second acquisition control step of controlling the acquisition of stored identification information, and a transmission control step of controlling the transmission of, to the communication apparatus which has transmitted the first feature information, the second feature information acquired in the first acquisition control step and the identification information acquired in the second acquisition control step.

A communication apparatus of the present invention includes a storage unit which stores first feature information indicating a feature of the communication apparatus, a first transmitter which transmits the first feature information stored in the storage unit to an electronic device, a receiver which receives the second feature information indicating a feature of another communication apparatus and identification information identifying the electronic device, transmitted from the electronic device, a second transmitter which establishes a connection with the other communication apparatus based on the second feature information received by the receiver and transmits the first feature information to the other communication apparatus, and a forming unit which stores the second feature information and forms a virtual private network with the other communication apparatus.

Preferably, the first feature information includes an IP address of the communication apparatus, and the second feature information includes an IP address of the other communication apparatus.

Preferably, the communication apparatus further includes a display which displays a predetermined image based on image data received by the receiver.

Preferably, the receiver receives an encryption key which is transmitted from the electronic device and is used in communication over the virtual private network formed by the forming unit.

Preferably, the first feature information includes information relating to the hardware configuration of the communication apparatus, and the second feature information includes information relating to the hardware configuration of the other communication apparatus.

A communication method of the present invention includes a storage step of storing first feature information indicating a feature of a communication apparatus, a first transmitting step of transmitting the first feature information stored in the first storage step to an electronic device, a receiving step of receiving second feature information indicating a feature of another communication apparatus and identification information identifying the electronic apparatus, transmitted from the electronic device, a second transmitting step of transmitting the first feature information to the other communication apparatus which is connected to the communication apparatus based on the second feature information received in the receiving step, and a forming step of forming a virtual private network with the other communication apparatus by storing the second feature information.

A storage medium of the present invention stores a computer readable program, which includes an acquisition control step of controlling the acquisition of stored first feature information indicating a feature of a communication apparatus, a first transmission control step of controlling the transmission of, to an electronic device, the first feature information acquired in the acquisition control step, a reception control step of controlling the reception of second feature information indicating another communication apparatus and identification information identifying the electronic apparatus, transmitted from the electronic device, a second transmission control step of controlling the transmission of the first feature information to the other communication apparatus which is connected to the communication apparatus based on the second feature information received in the reception control step, and a formation control step of controlling the formation of a virtual private network with the other communication apparatus by controlling the storage of the second feature information.

A computer program of the present invention includes an acquisition control step of controlling the acquisition of stored first feature information indicating a feature of a communication apparatus, a first transmission control step of controlling the transmission of, to an electronic device, the first feature information acquired in the acquisition control step, a reception control step of controlling the reception of second feature information indicating another communication apparatus and identification information identifying the electronic apparatus, transmitted from the electronic device, a second transmission control step of controlling the transmission of the first feature information to the other communication apparatus which is connected with the communication apparatus based on the second feature information received in the reception control step, and a formation control step of controlling the formation of a virtual private network with the other communication apparatus by controlling the storage of the second feature information.

In accordance with the network system and the communication method using the network system of the present invention, the electronic device receives the first feature information indicating the feature of the communication apparatus transmitted from the communication apparatus, and stores the first feature information and the second feature information indicating the feature of the other communication apparatus. The electronic device stores the identification information and transmits the second feature information and the identification information to the communication apparatus which transmits the first feature information. The communication apparatus stores the first feature information, and transmits the first feature information to the electronic device. The communication apparatus receives the second feature information and the identification information. The communication apparatus is connected to the other communication apparatus based on the second feature information, and then transmits the first feature information to the other communication apparatus. The communication apparatus stores the second feature information, thereby forming the virtual private network.

In accordance with the electronic device, the communication method of the electronic device, the storage medium, and the computer program of the present invention, the electronic device receives the first feature information transmitted from the communication apparatus and indicating the feature of the communication apparatus, and stores the first feature information and the second feature information indicating the feature of the other communication apparatus. The electronic device stores the identification information, and transmits the second feature information and the identification information to the communication apparatus which has transmitted the first feature information.

In accordance with the communication apparatus, the communication method of the communication apparatus, the storage medium, and the computer program, the communication apparatus stores the first feature information indicating the feature of its own, and transmits the first feature information to the electronic device. The communication apparatus receives the second feature information indicating the feature of the other communication apparatus and the identification information identifying the electronic device, transmitted from the electronic device. Based on the received second feature information, the communication apparatus is connected to the other communication apparatus, and transmits the first feature information to the other communication apparatus. The communication apparatus stores the second feature information, thereby establishing the virtual private network with the other communication apparatus.

BRIEF DESCRIPTION OF THE DRAWINGS

FIG. 8 shows an example of information stored in the IC card;

FIG. 10 shows another example of information stored in the IC card;

FIG. 12 shows yet another example of information stored in the IC card;

DESCRIPTION OF THE PREFERRED EMBODIMENTS

Figure 1:
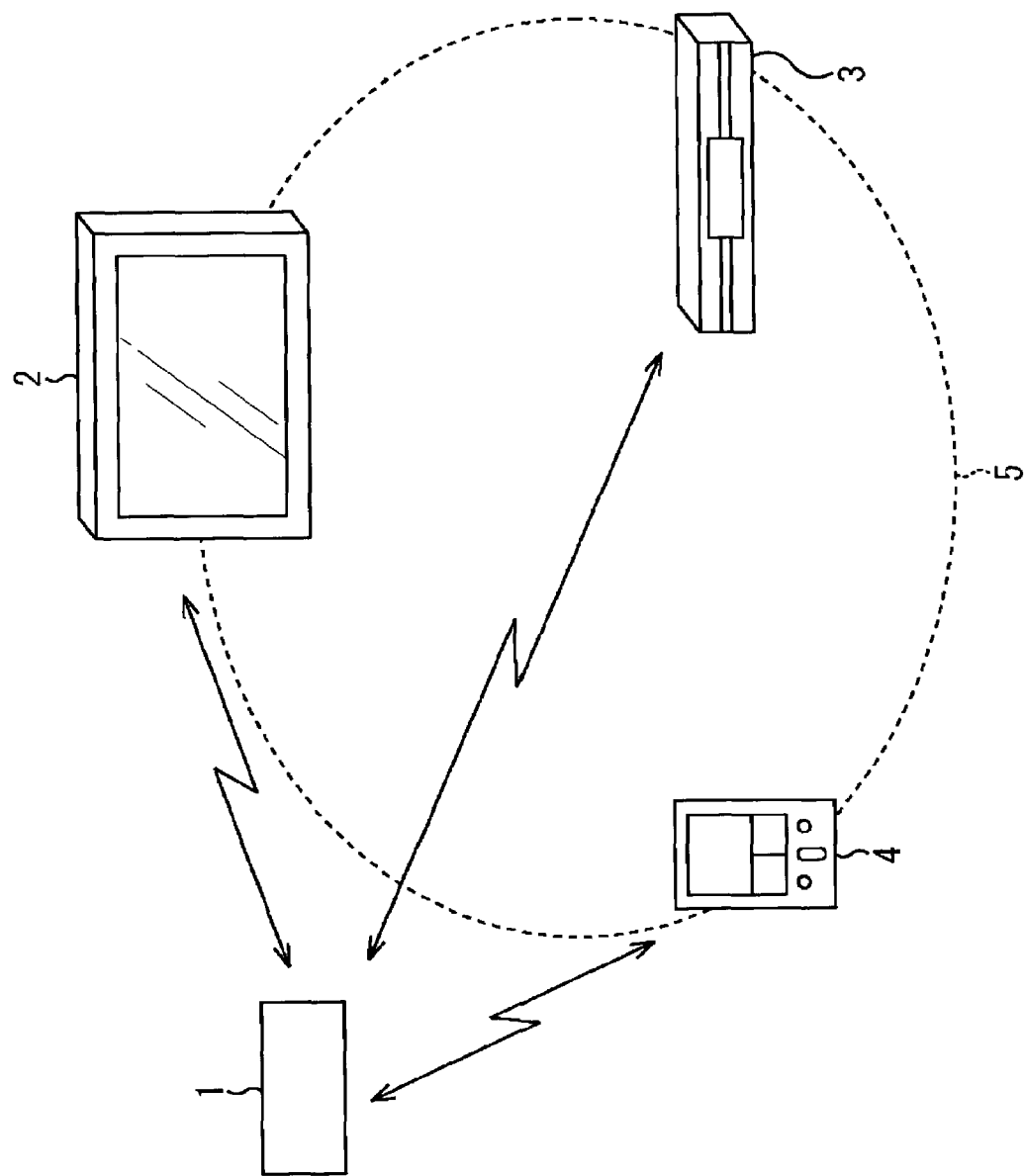
FIG. 1 shows the configuration of a network system incorporating the present invention.

FIG. 1 shows the configuration of a network system incorporating the present invention.

An IC card 1 stores a network ID (identification) as identification information unique to the network system. When the IC card 1 is placed in a predetermined position in the vicinity of each of a television receiver 2, a hard disk recorder 3, and a PDA (Personal Digital Assistant) 4, the network ID is read by each of these apparatuses.

The television receiver 2, the hard disk recorder 3, and the PDA 4 respectively include reader/writers (namely, IC card reader/writers 56 (see FIG. 3), 106 (see FIG. 5), and 126 (see FIG. 6)) which read the network ID stored in the IC card 1 by a non-contact communication.

When the user places the IC card 1 in the vicinity of the IC card reader/writer 106 in the hard disk recorder 3, the hard disk recorder 3 writes, to the IC card 1, a profile (feature information) including the IP address of its own. This process will be discussed in more detail later. Besides the above-mentioned network ID, the IC card 1 stores a list of profiles of closely placed apparatuses such as the television receiver 2 and the hard disk recorder 3. In this embodiment, the IP address is a host part of the IPv6 address.

When the hard disk recorder 3 reads the network ID and the profile list containing the profile (such as the IP address) of the television receiver 2 from the IC card 1, the hard disk recorder 3 accesses the television receiver 2 through a radio communication network such as the one defined in the IEEE (Institute of Electrical and Electronics Engineers) 802.11a, the IEEE 802.11b, the IEEE 802.11g, or the Bluetooth standard. The hard disk recorder 3 sends, to the television receiver 2, the profile list to which a profile of the hard disk recorder 3 read from the IC card 1 is newly added, and forms a VPN (Virtual Private Network) 5 with the television receiver 2.

When the IC card 1 is placed close to a plurality of apparatuses, a closely placed apparatus is successively added as a member of the VPN 5.

When the VPN 5 is formed between the television receiver 2 and the hard disk recorder 3, the IC card 1 may be placed close to the reader/writer 126 of the PDA 4. The profile of the PDA 4 is thus added to the profile list stored in the IC card 1.

The PDA 4 reads the profile list which is updated with the profile of its own added, and the network ID from the IC card 1, and accesses the television receiver 2 and the hard disk recorder 3 by the above-mentioned wireless network based on the profiles contained in the read profile list. The PDA 4 notifies the television receiver 2 and the hard disk recorder 3 of the read profile list (the profile list containing the profile of the PDA 4), and shares the same profile list in common, and forms the VPN 5 as illustrated by broken lines in FIG. 1.

The user forms the VPN 5 by simply placing the IC card 1 close to the apparatuses without the need for any complex setting. Rather than the wireless link discussed above, the system forms the VPN 5 using a wired network such as the Ethernet (Registered Trademark).

The apparatuses forming the network system shown in FIG. 1 will be discussed below.

Figure 2:
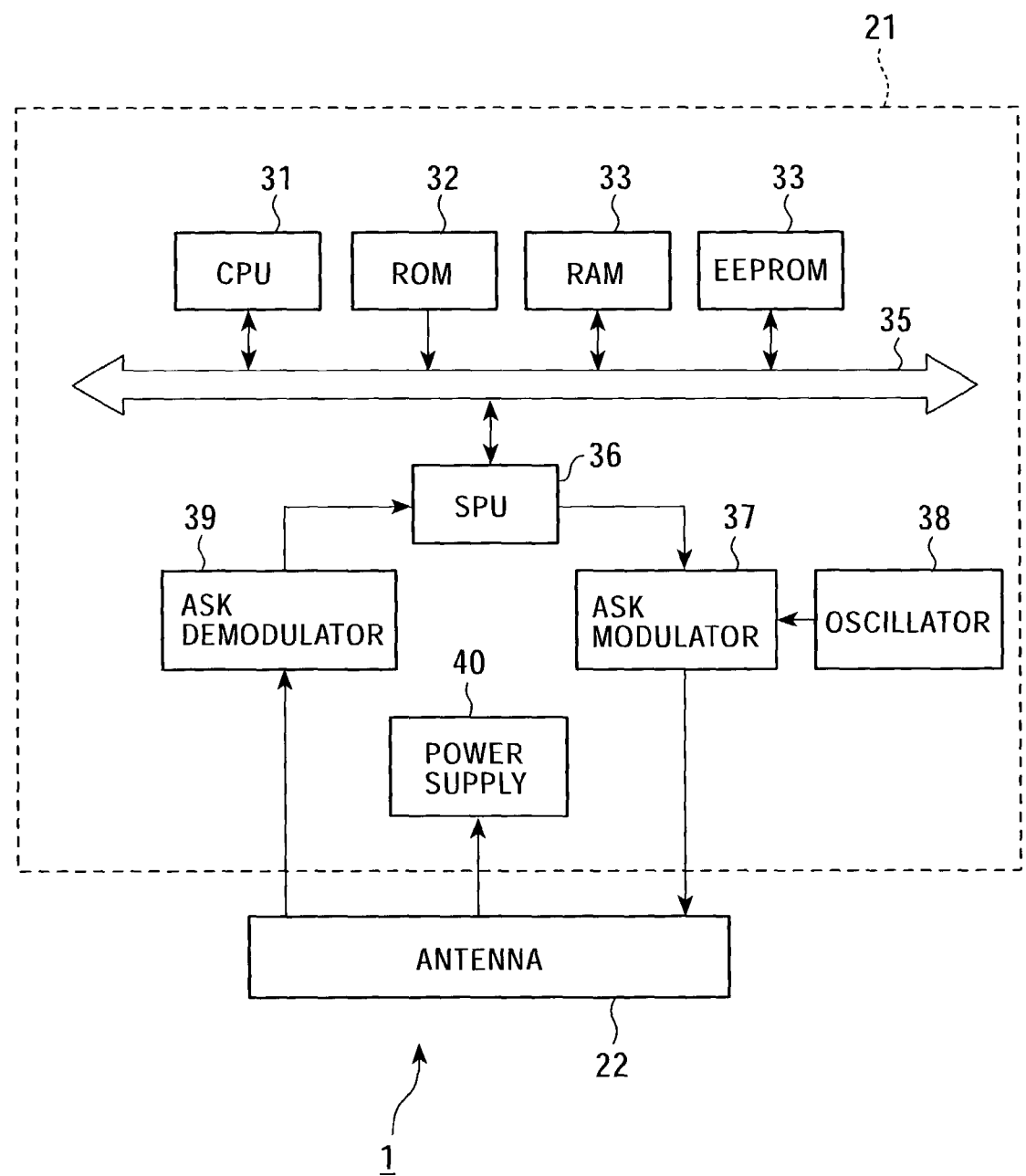
FIG. 2 is a block diagram showing the construction of an IC (integrated circuit) card of FIG. 1.

FIG. 2 is a block diagram showing the construction of the IC card 1 of FIG. 1.

The IC card 1 includes an antenna (loop antenna) 22, and an IC 21 which is a single chip IC containing elements other than the antenna 22. Using electromagnetic induction, the IC card 1 exchanges data with the IC card reader/writer 56 in the television receiver 2 in a half-duplex operation.

A CPU (Central Processing Unit) 31 develops a control program stored in an ROM (Read-Only Memory) 32 into an RAM (Random Access Memory) 33, thereby controlling the whole operation of the IC card 1. The CPU 31 notifies the IC card reader/writer 56 in the nearby television receiver 2 of the network ID and the profile list stored in an EEPROM (Electrically Erasable and Programmable Read Only Memory) 34.

An SPU (Signal Processing Unit) 36 decodes data (decodes Manchester codes) in accordance with a clock signal supplied by a PLL (not shown) when data demodulated by a ASK (Amplitude Shift Keying) demodulator 39 is BPSK (Binary Phase Shift Keying) modulated. The demodulated data is output to the CPU 31 through a bus 35 as necessary.

The SPU 36 BPSK modulates data supplied through the bus 35 (encoding into the Manchester codes), and outputs the modulated data to an ASK modulator 37.

When data such as the network TD and the profile list is transmitted to the nearby apparatus, the ASK modulator 37 causes a predetermined switching element to turn on and off in response to the data supplied from the SPU 36. With the switching element turned on, the ASK modulator 37 connects a predetermined load in parallel with the antenna 22, thereby changing the load of the antenna 22.

With the load of the antenna 22 changing, the ASK modulator 37 ASK modulates a modulated wave received through the antenna 22, namely, radiated from the reader/writer of the nearby apparatus. The modulated component is transmitted to the reader/writer of the nearby apparatus through the antenna 22 (changing a terminal voltage across an antenna of the reader/writer) (This operation is referred to as a load switching method).

The ASK demodulator 39 demodulates a modulated signal (an ASK modulated signal) received through the antenna 22 to detect the envelope of the signal, and outputs the demodulated signal to the SPU 36. The antenna 22 resonates in response to an electromagnetic wave at a predetermined frequency radiated from the reader/writer.

A power supply 40 rectifies and regulates an alternating current generated in the antenna 22, and supplies the resulting DC current to each block. For example, the electromagnetic wave radiated from the reader/writer in the television receiver 2 is adjusted in level high enough to operate the IC card 1.

The "IC card" is a terminology used for convenience. The IC card refers to a module having a function described above or to be described later. Felica (Registered Trademark) has substantially the same function as that of the IC card 1.

Figure 3:
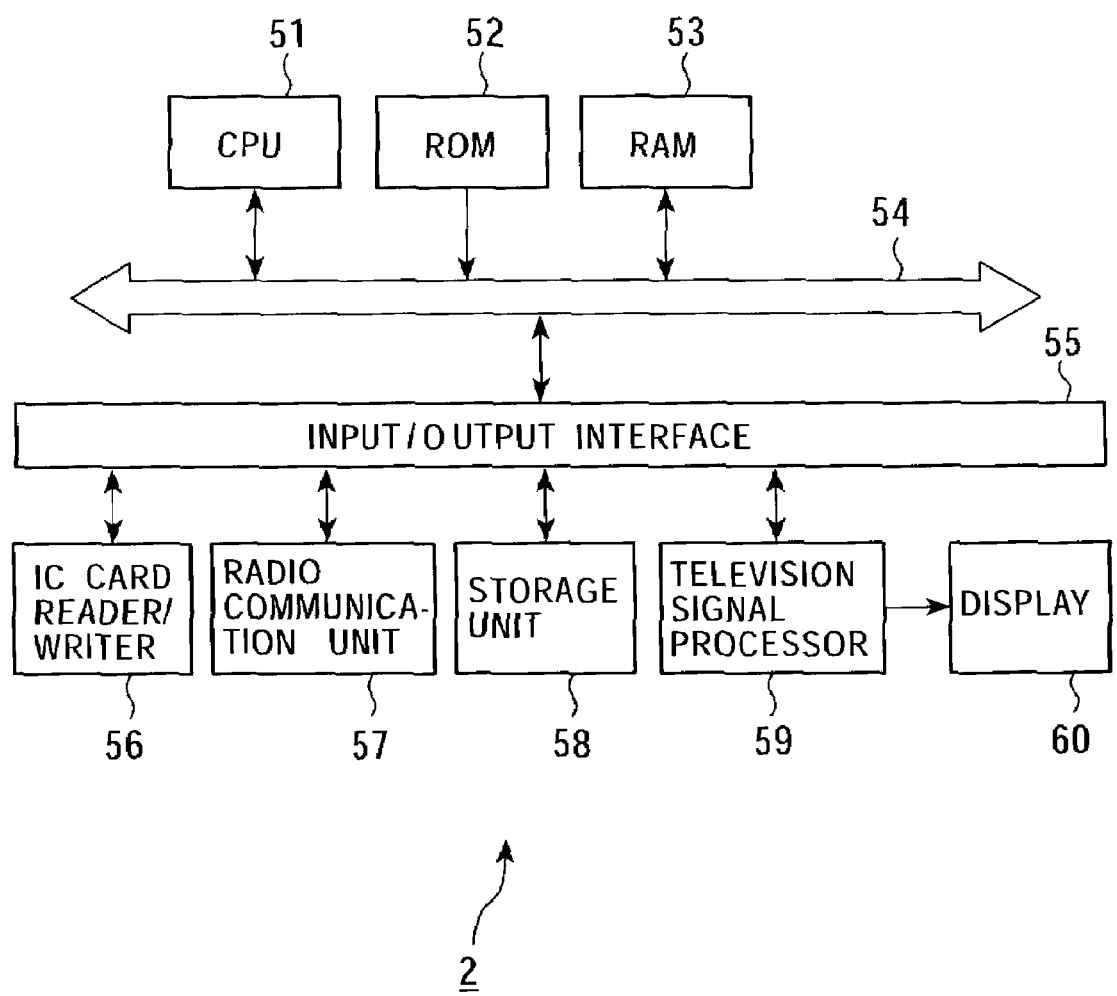
FIG. 3 is a block diagram showing the construction of a television receiver of FIG. 1.

FIG. 3 is a block diagram showing the construction of the television receiver 2 of FIG. 1.

A CPU 51 carries out a variety of processes in accordance with a computer program stored in an ROM 52 or a storage unit 58. An RAM 53 stores programs carried out by the CPU 51 or data as necessary. The CPU 51, the ROM 52, and the RAM 53 are interconnected to each other through a bus 54.

An input/output interface 55 is connected to the bus 54. Connected to the input/output interface 55 are the IC card reader/writer 56 that communicates with the nearby IC card 1 in a non-contact fashion using an electromagnetic wave, and a radio communication unit 57 that performs radio communication with member apparatuses forming a VPN through a radio communication link as defined in the IEEE (Institute of Electrical and Electronics Engineers) 802.11a, the IEEE 802.11b, the IEEE 802.11g, or Bluetooth standard.

If the IP address of the hard disk recorder 3 is registered in the profile list read from the IC card reader/writer 56, the radio communication unit 57 accesses the hard disk recorder 3 in accordance with the IP address, and sends a variety of pieces of information such as the network ID and the profile list to the hard disk recorder 3. The radio communication unit 57 also exchanges various pieces of information with a member apparatus forming the VPN.

The storage unit 58 such as the hard disk or flash memory is connected to the input/output interface 55. The storage unit 58 stores the network ID and the profile list read from the IC card 1. Furthermore, the storage unit 58 stores beforehand the profile of the television receiver 2. As will be discussed in detail later, the profile includes information relating to a hardware configuration besides the IP address of the television receiver 2.

A television signal processor 59 includes a front end amplifier, a tuner, a demultiplexer, a decoder, an analog-to-digital converter, etc. The television signal processor 59 processes broadcast radiowaves received by an antenna (not shown), and television program data supplied by the hard disk recorder 3 through communication with the radio communication unit 57, and presents a video, on a display 60. A detailed discussion of the construction of the television signal processor 59 is omitted here.

Figure 4:
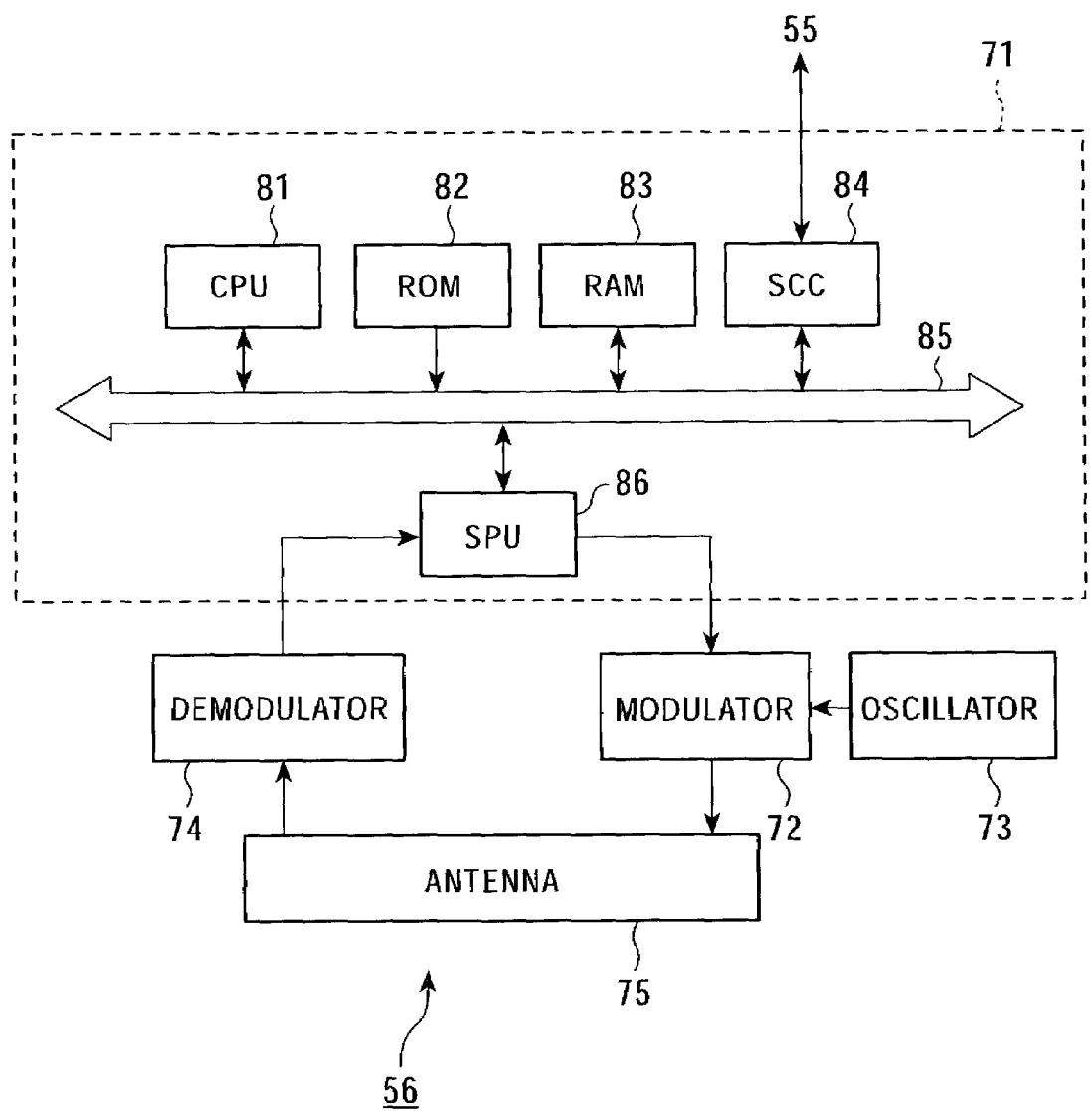
FIG. 4 is a block diagram showing the construction of an IC card reader/writer of FIG. 3.

FIG. 4 is a block diagram showing in detail the construction of the IC card reader/writer 56 of FIG. 3.

An IC 71 includes a CPU 81, an ROM 82, an RAM 83, an SCC (Serial Communication Controller) 84, an SPU 86, and a bus 85 which interconnects the components of the CPU 81 through the SPU 86.

The CPU 81 develops a control program stored in the ROM 82 into the RAM 83, and carries out a variety of processes in response to response data transmitted from the IC card 1 and a control signal supplied from the CPU 51 shown in FIG. 3. Furthermore, the CPU 81 generates a command to be transmitted to the IC card 1, and outputs the command to the SPU 86 through the bus 85, and performs an authentication process on data transmitted from the IC card 1.

When the IC card 1 is placed close to the television receiver 2, the television receiver 2 receives the profile list from the IC card 1. In response to a command from the CPU 51, the CPU 81 transfers the profile list to one of the radio communication unit 57 and the storage unit 58.

The SCC 84 supplies the CPU 81 with data from the CPU 51 shown in FIG. 3 through the bus 85, and outputs data provided by the CPU 81 through the bus 85 to the CPU 51.

The SCC 84 BPSK decodes response data received from the IC card 1 through a demodulator 74 (decodes Manchester codes), and supplies the CPU 81 with the resulting data. When a command to be transmitted to the IC card 1 is supplied through the bus 85, the SPU 86 BPSK modulates the command (encodes the command into Manchester codes), and outputs the resulting data to a modulator 72.

The modulator 72 ASK modulates a carrier having a predetermined frequency (at 13.56 Mhz, for example) supplied from an oscillator 73 with data supplied from the SPU

86. The modulated signal is then output through an antenna 75 in an electromagnetic wave. The demodulator 74 demodulates a modulated signal (an ASK modulated signal) coming in from the antenna 75, and outputs the demodulated signal to the SPU 86.

The antenna 75 radiates a predetermined electromagnetic wave and the IC card reader/writer 56 determines whether the IC card 1 is within a close range from the antenna 75 based on a change in the load of the antenna 75. If the IC card 1 is within a close range, the antenna 75 exchanges a variety of data with the IC card 1.

The IC card reader/writer 106 in the hard disk recorder 3, and the reader/writer 126 in the PDA 4, both discussed later, have the same construction as that of the IC card reader/writer 56 shown in FIG. 4.

Figure 5:
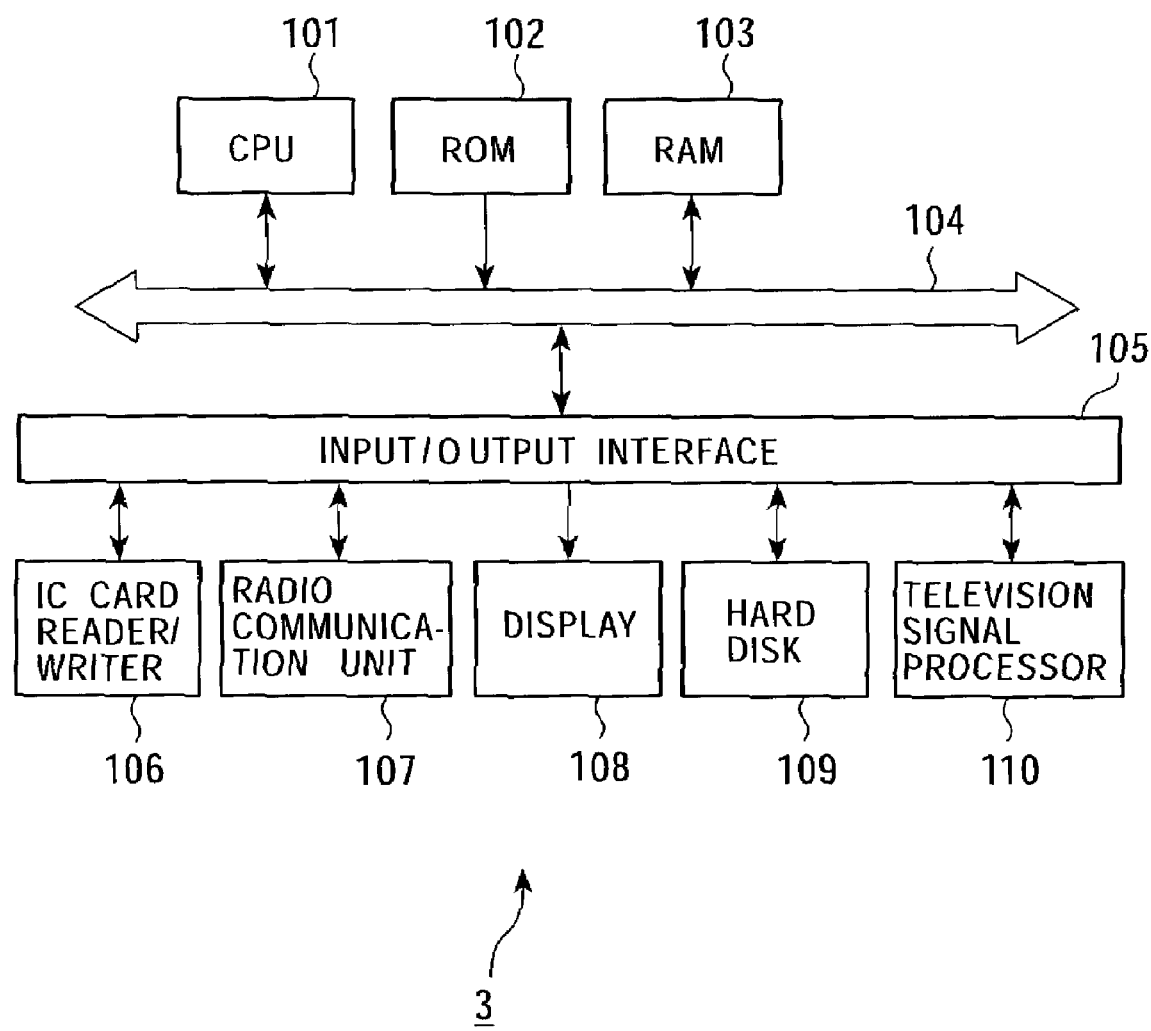
FIG. 5 is a block diagram showing the construction of a hard disk recorder of FIG. 1.

FIG. 5 is a block diagram showing the construction of the hard disk recorder 3 of FIG. 1.

A CPU 101 controls the whole operation of the hard disk recorder 3 through a bus 104 and an input/output interface 105 in accordance with a program stored in an ROM 102 or a hard disk 109.

The IC card reader/writer 106 communicates with the IC card 1 in a non-contact fashion, thereby reading a variety of pieces of information including the network ID and the profile list from the IC card 1.

A radio communication unit 107 communicates with the radio communication unit 57 in the above-referenced television receiver 2 through radio communication based on a radio communication link as defined in the IEEE (Institute of Electrical and Electronics Engineers) 802.11a, the IEEE 802.11b, the IEEE 802.11g, or Bluetooth standard. Television program data stored in the hard disk 109 is thus sent to the television receiver 2.

A display 108 presents a variety of pieces of information such as current time and pre-programmed record setting on the screen thereof to the user.

The hard disk 109 stores television program data processed and then supplied by a television signal processor 110. For example, data compressed in an MPEG (Moving Picture Experts Group) 2 format is supplied by the television signal processor 110. Furthermore, the hard disk 109 stores the profile of the hard disk recorder 3, and the network ID and the profile list from the IC card 1 read by the IC card reader/writer 106.

The television signal processor 110 compresses a television signal supplied from a tuner (not shown) in the MPEG 2 format, and then feeds the resulting signal to the hard disk 109.

Figure 6:
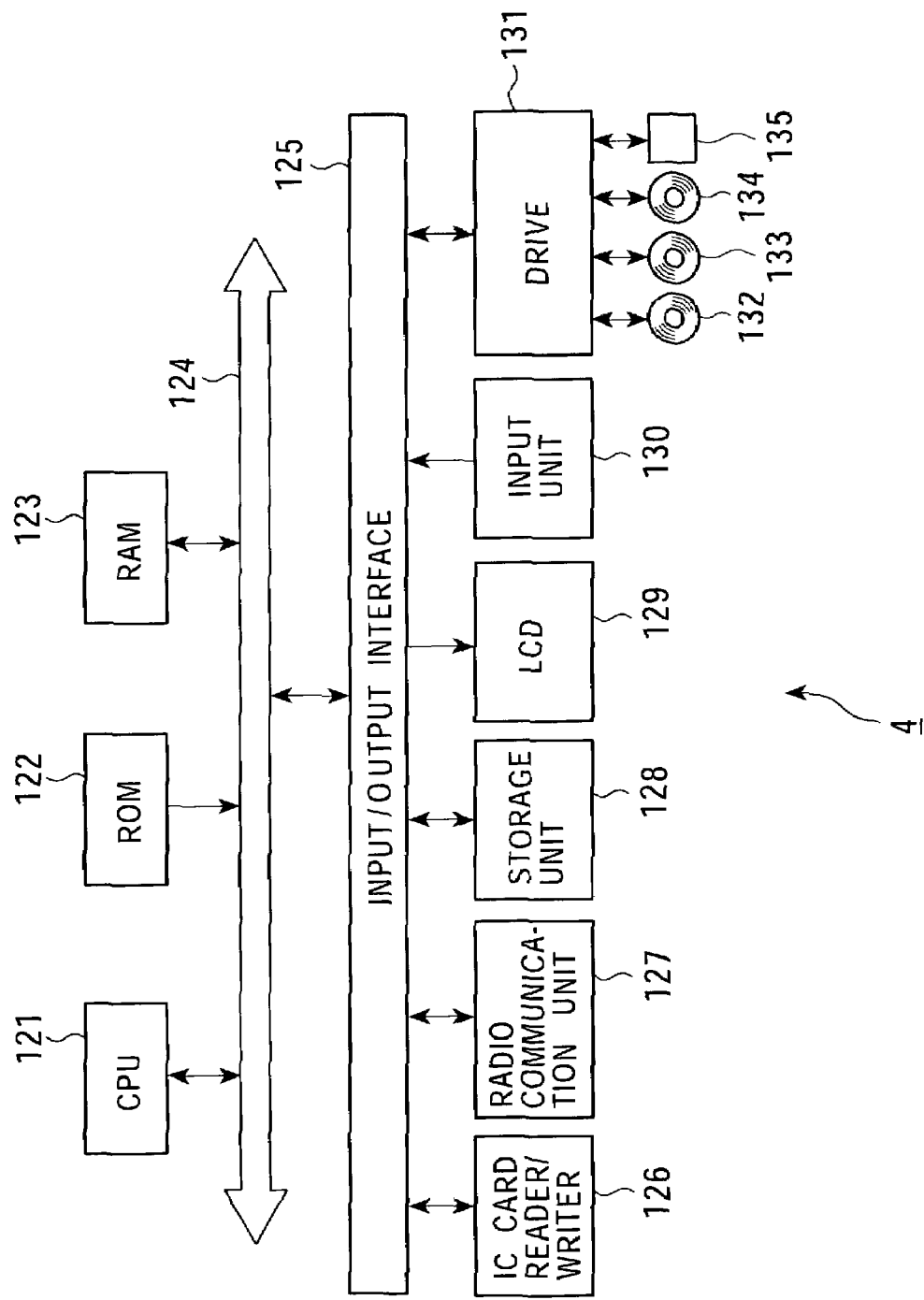
FIG. 6 is a block diagram showing the construction of a PDA (personal digital assistant) of FIG. 1.

FIG. 6 is a block diagram showing the construction of the PDA 4 of FIG. 1.

A CPU 121 through a radio communication unit 127 are substantially identical to the CPU 101 through the radio communication unit 107 in the hard disk recorder 3 shown in FIG. 5. The reader/writer 126 communicates with the IC card 1 in a non-contact fashion, and the radio communication unit 127 radio-communicates with the apparatuses forming the VPN in compliance with the predetermined standards.

A storage unit 128, for example, formed of a flash memory, stores the profile of the PDA 4 and the network ID and the profile list from the IC card 1 read by the reader/writer 126.

A LCD (Liquid-Crystal Display) 129 presents a variety of pieces of information on the screen thereof to the user in response to a command from the CPU 121. The user, for example, retrieves television program data stored in the hard disk recorder 3, and writes the television program data into the PDA 4 through the VPN 5 to present the corresponding video on the LCD 129.

An input unit 130 includes a touch panel and various input buttons, and conveys inputs from the user to the CPU 121.

A drive 131 is connected to an input/output interface 125. One of a magnetic disk 132, an optical disk 133, a magneto-optical disk 134, a semiconductor memory 135 is loaded in the drive 131 as necessary. A computer program read therefrom is installed in the storage unit 128 as necessary.

The operation of the network system shown in FIG. 1 is discussed below.

The process carried out by the IC card 1 and the television receiver 2 with no VPN formed yet is discussed with reference to a flow diagram shown in FIG. 7.

The IC card 1 responds to an electromagnetic wave which is periodically output by the IC card reader/writer 56. When the CPU 51 in the television receiver 2 detects a response from the IC card 1 (when the IC card 1 comes within a close range from the television receiver 2), the CPU 51 controls the IC card reader/writer 56 to notify (transmit to) the IC card 1 of the profile of the television receiver 2 stored in the storage unit 58 in step S11.

In step S1, the CPU 31 controls the blocks in the IC card 1 to receive the profile transmitted from the IC card reader/writer 56 in the television receiver 2, and proceeds to step S2. The CPU 31 registers the profile in the profile list stored in the EEPROM 34. In its initial state, the EEPROM 34 has no profile registered.

FIG. 8 show an example of information stored in the EEPROM 34 in the IC card 1 registered in step S2.

As shown, the EEPROM 34 stores the network ID set beforehand, and the profile of the television receiver 2 received in step S1. Referring to FIG. 8, the network ID of the IC card 1 is "001". Registered as the profile of the television receiver 2 are an IP address "aaaa:aaaa:aaaa:aaaa" of the television receiver 2, and "IEEE 802.11a COMMUNICATION MODULE" and "MPEG 2 DECODER" as a hardware configuration of the television receiver 2.

In step S3, the CPU 31 sends the information stored in the EEPROM 34, namely, the network ID and the profile list of the television receiver 2 shown in FIG. 8, to the television receiver 2.

In step S12, the CPU 51 in the television receiver 2 receives the network ID and the profile list transmitted from the IC card 1, and then proceeds to step S13 to store the network ID and the profile list in the storage unit 58. In other words, the storage unit 58 in the television receiver 2 stores the same information as that shown in FIG. 8.

Figure 7:
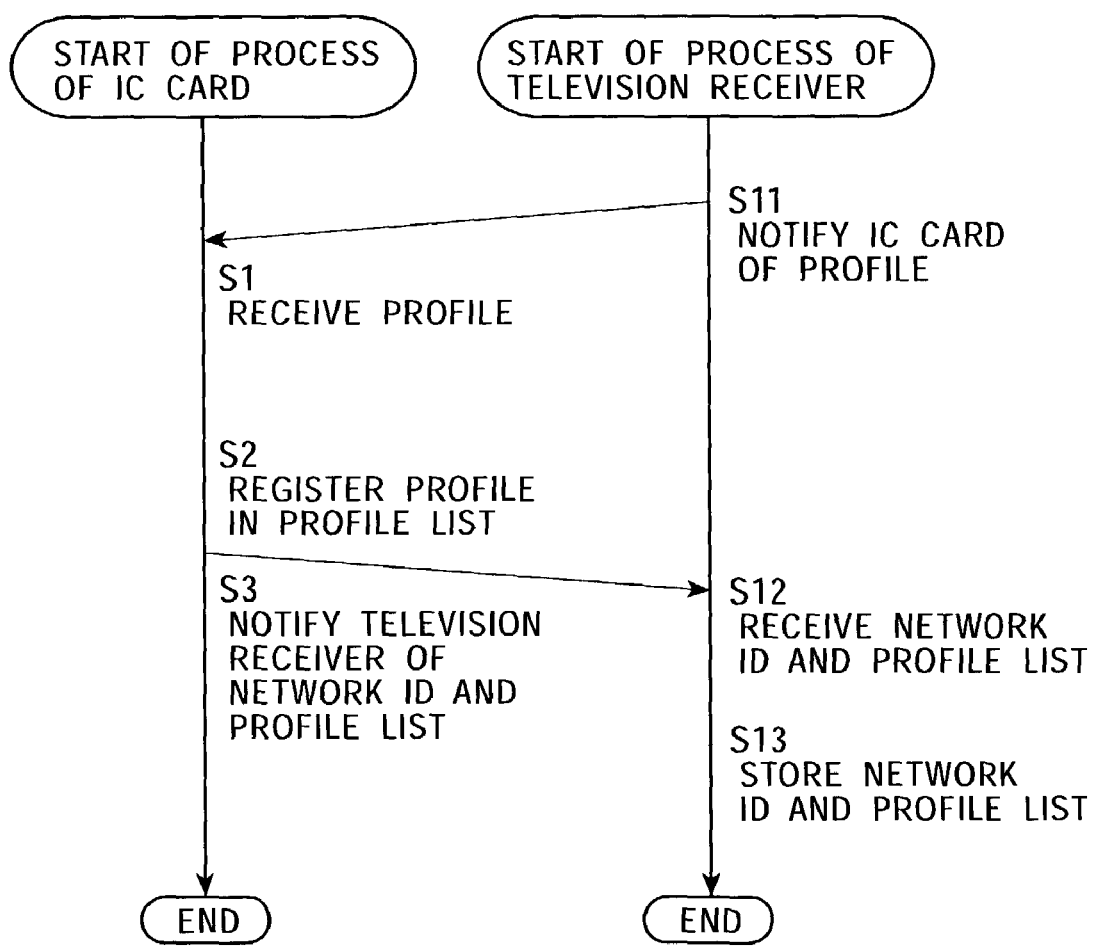
FIG. 7 is a flow diagram showing a process of the network system of FIG. 1.
Figure 9:
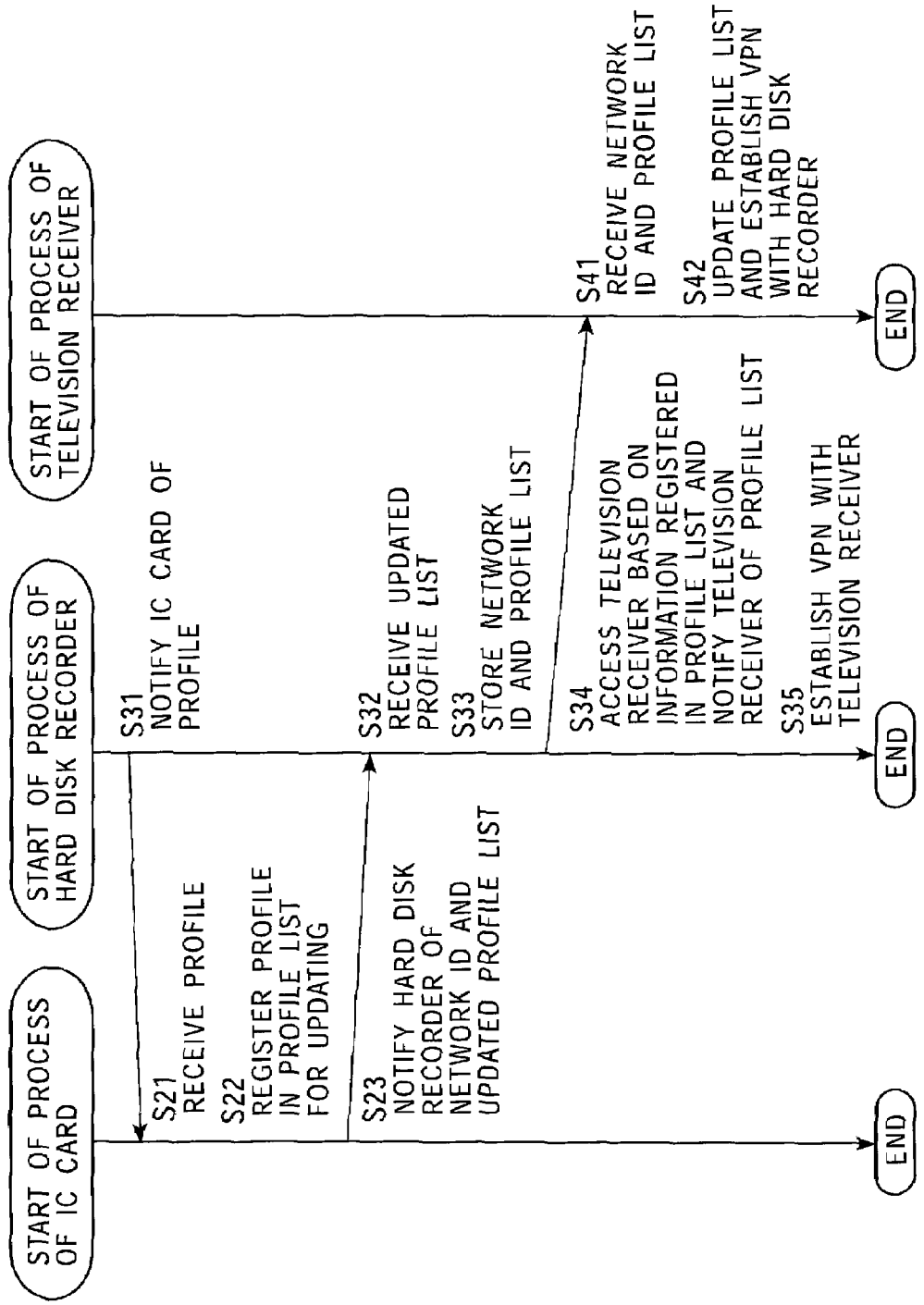
FIG. 9 is a flow diagram showing another process of the network system shown in FIG. 1.

FIG. 9 shows a flow diagram of the process in which the IC card 1 having the profile of the television receiver 2 registered in the process illustrated in FIG. 7 is now placed close to the hard disk recorder 3.

When the IC card reader/writer 106 notifies the CPU 101 in the hard disk recorder 3 that the IC card 1 is detected, the CPU 101 reads the profile of the hard disk recorder 3 stored in the hard disk 109, and sends the profile to the IC card 1 through the IC card reader/writer 106 in step S31.

In step S21, the CPU 31 in the IC card 1 receives the profile from the IC card reader/writer 106 in the hard disk recorder 3, and then proceeds to step S22. The CPU 31 stores, in the EEPROM 34, the profile transmitted from the hard disk recorder 3, thereby updating the information in the profile list.

FIG. 10 shows another example of information stored in the EEPROM 34 in step S22.

As shown, the profile list includes the profile of the hard disk recorder 3 received in step S21 besides the information shown in FIG. 8.

In this example, the IP address of the hard disk recorder 3 is "bbbb:bbbb:bbbb:bbbb", and "IEEE 802.11a COMMUNICATION MODULE" and "MPEG 2 DECODER" are added in the hard disk recorder 3.

In step S23, the CPU 31 in the IC card 1 controls the IC card reader/writer 56 to notify the hard disk recorder 3 of the network ID and the profile list stored in the EEPROM 34.

The CPU 101 in the hard disk recorder 3 receives information from the IC card 1 in step S32, and stores the information in the hard disk 109 in step S33.

In step S34, the CPU 101 controls the radio communication unit 107 to access the television receiver 2 in accordance with the information registered in the profile list. The CPU 101 notifies the television receiver 2 of the updated profile list including the profile of its own (namely, of the hard disk recorder 3).

If the information illustrated in FIG. 10 is stored in the hard disk 109 subsequent to the process in step S33, the CPU 101 controls the radio communication unit 107, which is an IEEE 802.11a communication module, and accesses the television receiver 2 in accordance with the IP address of "aaaa:aaaa:aaaa:aaaa", and transmits the information of the entire profile list to the television receiver 2 through radio communication in compliance with the IEEE 802.11a standard.

In this way, the profile of the hard disk recorder 3 is acquired by the television receiver 2 (in other words, the profile list registered in the IC card 1 is commonly shared).

In step S35, the CPU 101 performs a variety of settings, and forms a VPN with the television receiver 2.

In step S41, the CPU 51 in the television receiver 2 controls the radio communication unit 57, thereby receiving the information transmitted from the hard disk recorder 3. In step S42, the CPU 51 updates the profile list stored in the storage unit 58 with the received information, and forms a VPN with the hard disk recorder 3. In other words, the information shown in FIG. 10 is stored in the storage unit 58, and the VPN is set up with the hard disk recorder 3 after the predetermined setting is performed.

The user in this way transfers the television program data stored in the hard disk recorder 3 to the television receiver 2 via the VPN 5 to present the corresponding video on the screen of the television receiver 2. In the hard disk recorder 3, the stored program data is read from the hard disk 109, and is then transmitted from the radio communication unit 107 to the television receiver 2 through radio communication in compliance with the IEEE 802.11a standard. The transmitted program data is received by the radio communication unit 57 in the television receiver 2, and is then processed by the television signal processor 59 for replaying. The video of the program is thus presented on the display 60.

Figure 11:
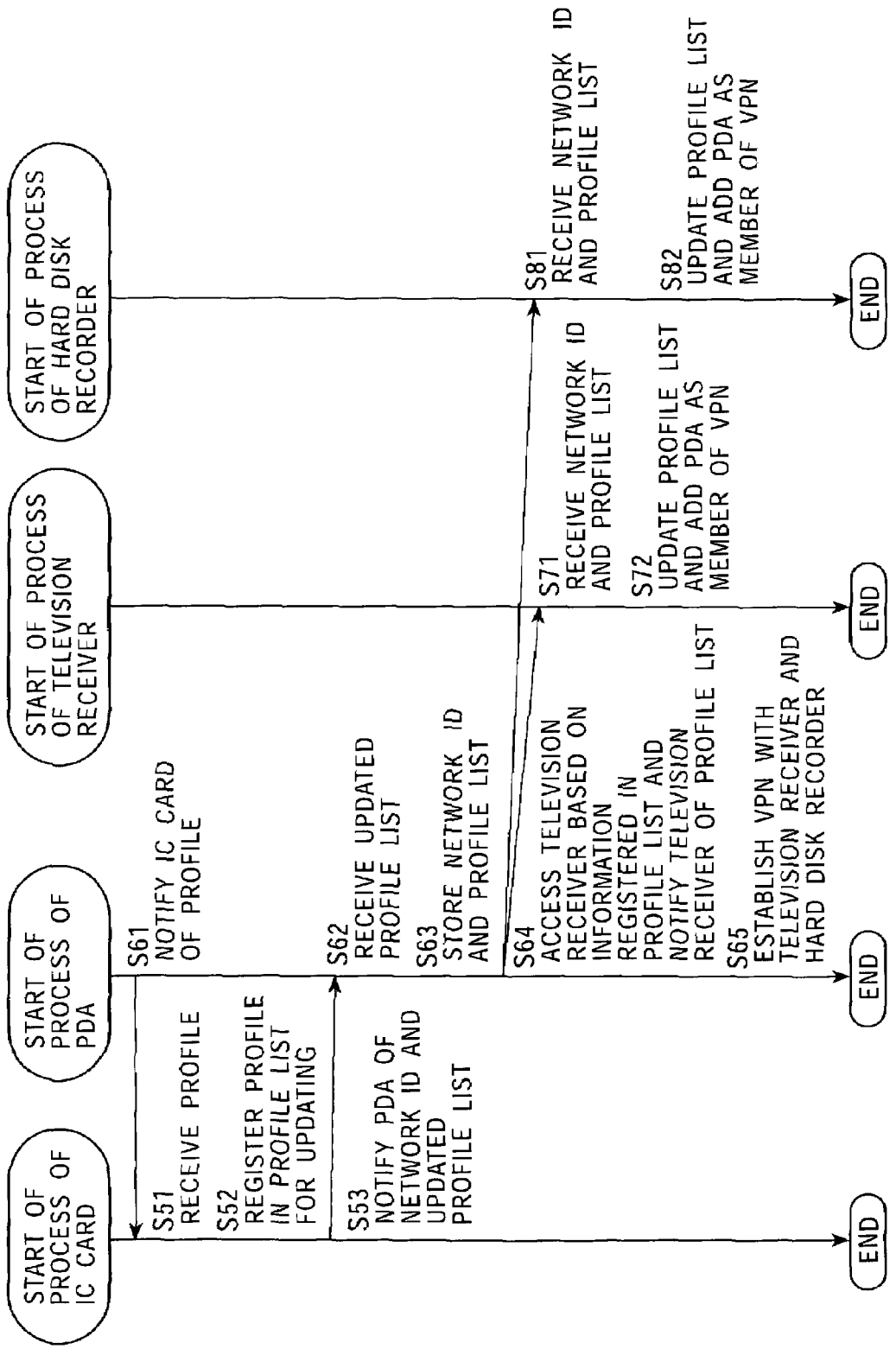
FIG. 11 is a flow diagram showing still another process of the network system of FIG. 1.

A flow diagram in FIG. 11 shows the process performed when the IC card 1 comes within a close range of the PDA 4 after the VPN is established between the television receiver 2 and the hard disk recorder 3. The PDA 4 also performs a process similar to that performed by the hard disk recorder 3 as discussed with reference to FIG. 9.

When the reader/writer 126 notifies the CPU 121 in the PDA 4 that the IC card 1 is detected, the CPU 121 reads the profile of its own stored in the storage unit 128 and notifies the IC card 1 of the profile through the reader/writer 126 in step S61.

In step S51, the CPU 31 in the IC card 1 receives the profile transmitted from the reader/writer 126 in the PDA 4, and then proceeds to step S52 to store the profile in the EEPROM 34. The CPU 31 thus updates the profile list.

FIG. 12 shows yet another example of information stored in the EEPROM 34 in step S52.

As shown, the profile list includes the profile of the PDA 4 received in step S51 in addition to the information illustrated in FIG. 10.

The IP address of the PDA 4 is "cccc:cccc:cccc:cccc" and an "IEEE 802.11a COMMUNICATION MODULE" and an "MPEG 2 DECODER" are set in the PDA 4.

In step S53, the CPU 31 in the IC card 1 controls the IC card reader/writer 56, thereby notifying the PDA 4 of the network ID and the updated profile list stored in the EEPROM 34.

The CPU 121 in the PDA 4 receives the information notified of by the IC card 1 in step S62, and stores the information in the storage unit 128 in step S63.

In step S64, the CPU 121 controls the radio communication unit 127, thereby accessing the television receiver 2 and the hard disk recorder 3 in accordance with the information registered in the profile list. The CPU 121 then notifies the television receiver 2 and the hard disk recorder 3 of the profile list that includes the profile of its own (of the PDA 4).

If the information shown in FIG. 12 is stored in the storage unit 128 subsequent to step S63, the CPU 121 controls the radio communication unit 127, which is an IEEE 802.11a communication module, and accesses the television receiver 2 in accordance with the IP address "aaaa:aaaa:aaaa:aaaa", and transmits the profile list to the television receiver 2. In accordance with the IP address "bbbb:bbbb:bbbb:bbbb", the CPU 121 accesses the hard disk recorder 3, thereby notifying the hard disk recorder 3 of the profile list.

In this way, the profile of the PDA 4 is acquired by the television receiver 2 and the hard disk recorder 3. The profiles of the apparatuses and the network ID of the IC card 1 are commonly shared among these apparatuses.

In step S65, the CPU 121 performs a predetermined setting, thereby forming a VPN with the television receiver 2 and the hard disk recorder 3.

In step S71, the CPU 51 in the television receiver 2 controls the radio communication unit 57, thereby receiving the information sent from the PDA 4. The CPU 51 proceeds to step S72 to update the profile list stored in the storage unit 58 in accordance with the received information. The PDA 4 is added as a member apparatus forming the VPN. In other words, the information shown in FIG. 12 is stored in the storage unit 58.

In step S81, the CPU 101 in the hard disk recorder 3 controls the radio communication unit 107, thereby receiving the information transmitted from the PDA 4. The CPU 101 proceeds to step S82 to update the profile list stored in the hard disk 109 in accordance with the received information. The PDA 4 is added as a member apparatus forming the VPN. In other words, the information shown in FIG. 12 is stored in the hard disk 109. The VPN 5, formed of the television receiver 2, the hard disk recorder 3, and the PDA 4, results as shown in FIG. 1.

The user easily and quickly establishes the VPN 5 formed of these apparatuses by simply placing the IC card 1 close to each apparatus. To add a new apparatus as a member apparatus of the VPN, the user simply places the IC card 1 close to a reader/writer of the new apparatus.

In the above discussion, all apparatuses to which the IC card 1 is placed close are added as member apparatuses of the VPN. A secure VPN may be established by performing an authentication process between these apparatuses. In this case, the user must set up a password for each member apparatus.

Figure 13:
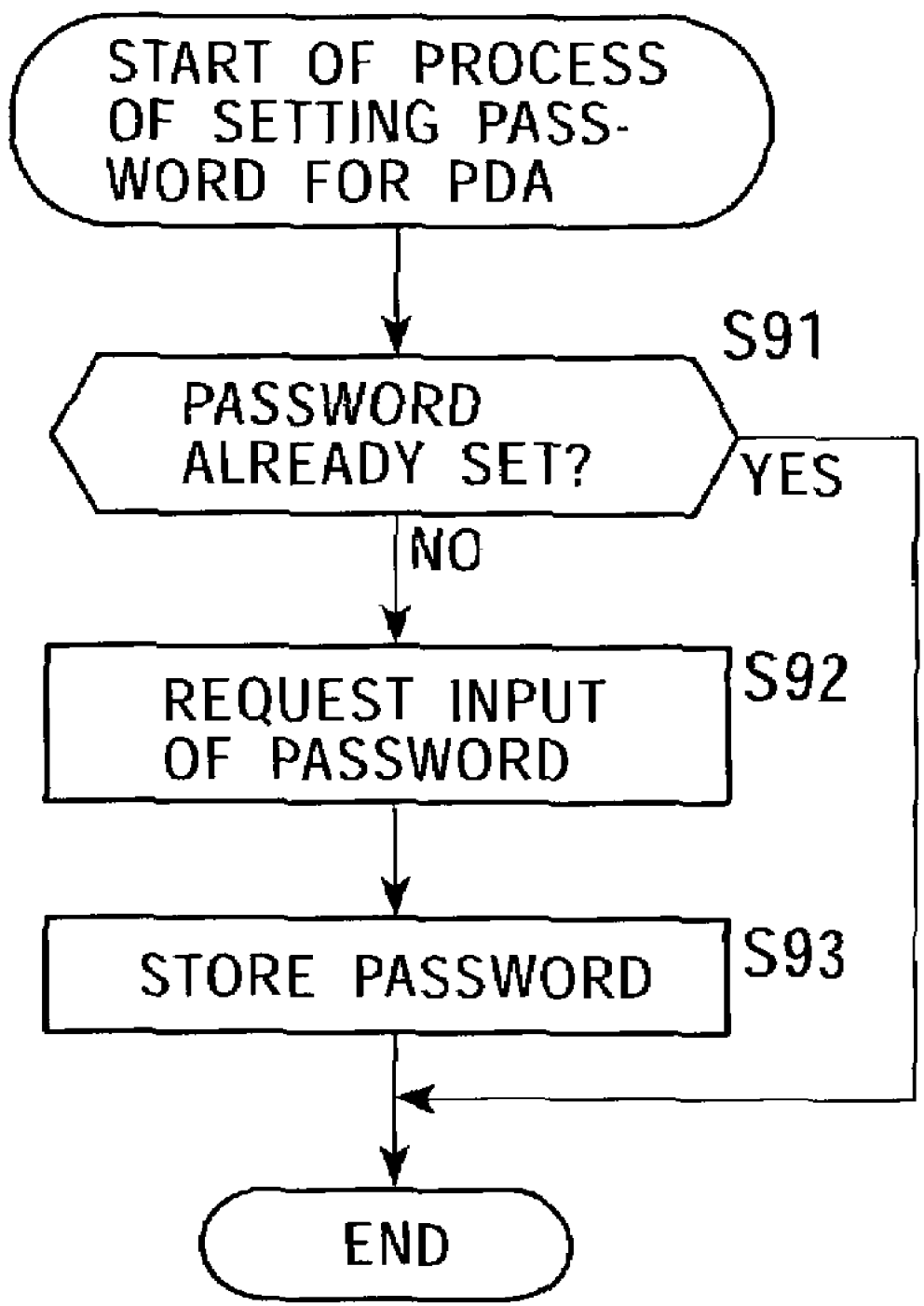
FIG. 13 is a flow diagram showing a process of the PDA.

The process of the PDA 4 for setting a password is discussed with reference to a flow diagram shown in FIG. 13. The same process is performed on each of the television receiver 2 and the hard disk recorder 3.

In step S91, the CPU 121 in the PDA 4 determines whether a password is set. If it is determined that a password is set, the process ends. If it is determined in step S91 that no password is set, the algorithm proceeds to step S92. The CPU 121 requests the user to input the password. For example, the CPU 121 presents a predetermined input screen on the LCD 129 to request the user to input the password there.

When the user operates the input unit 130 to input a password of a predetermined number of alphanumeric characters, the CPU 121 stores the password in the storage unit 128 in step S93.

Figure 14:
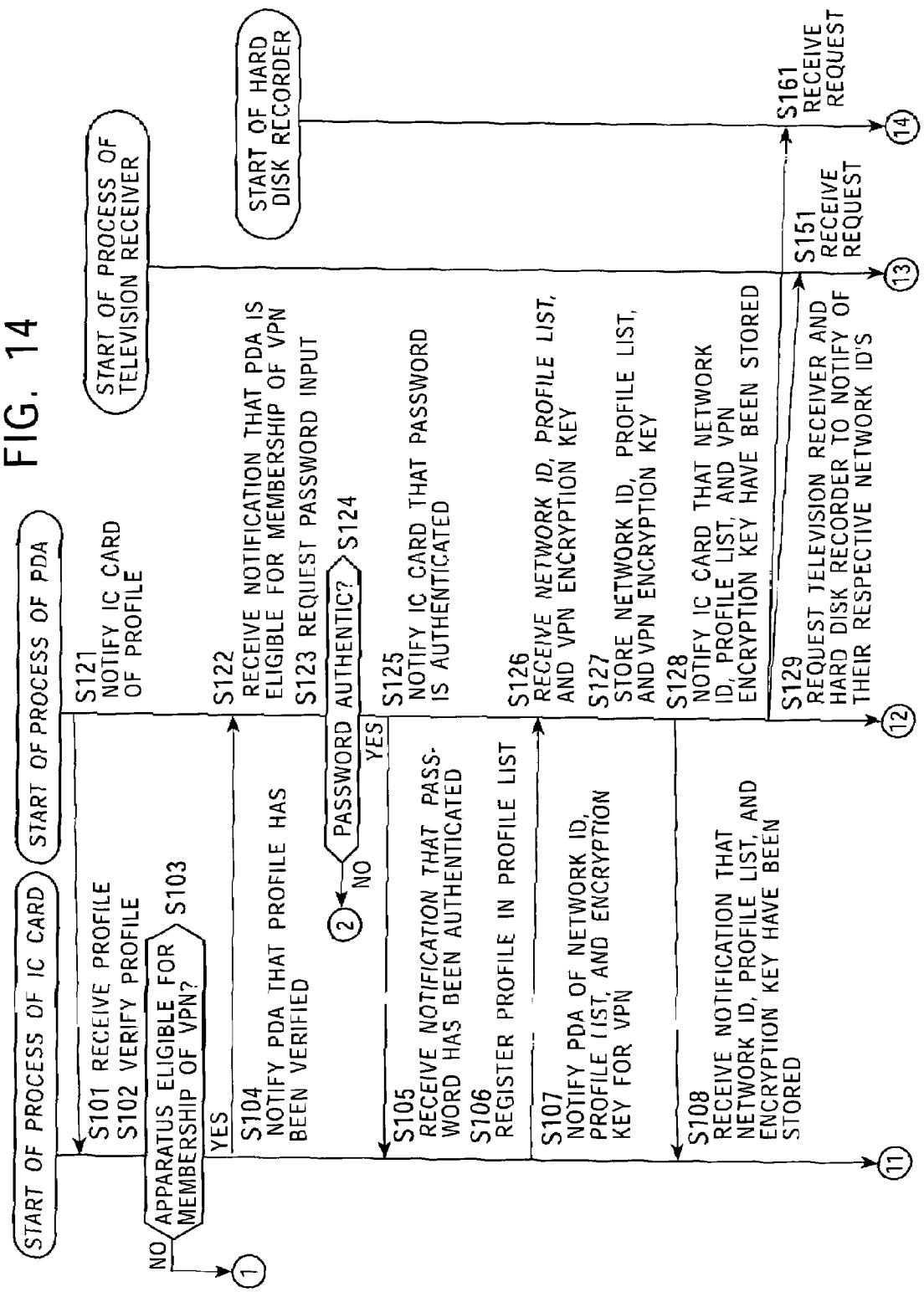
FIG. 14 is a flow diagram showing still another process of the network system of FIG. 1.
Figure 15:
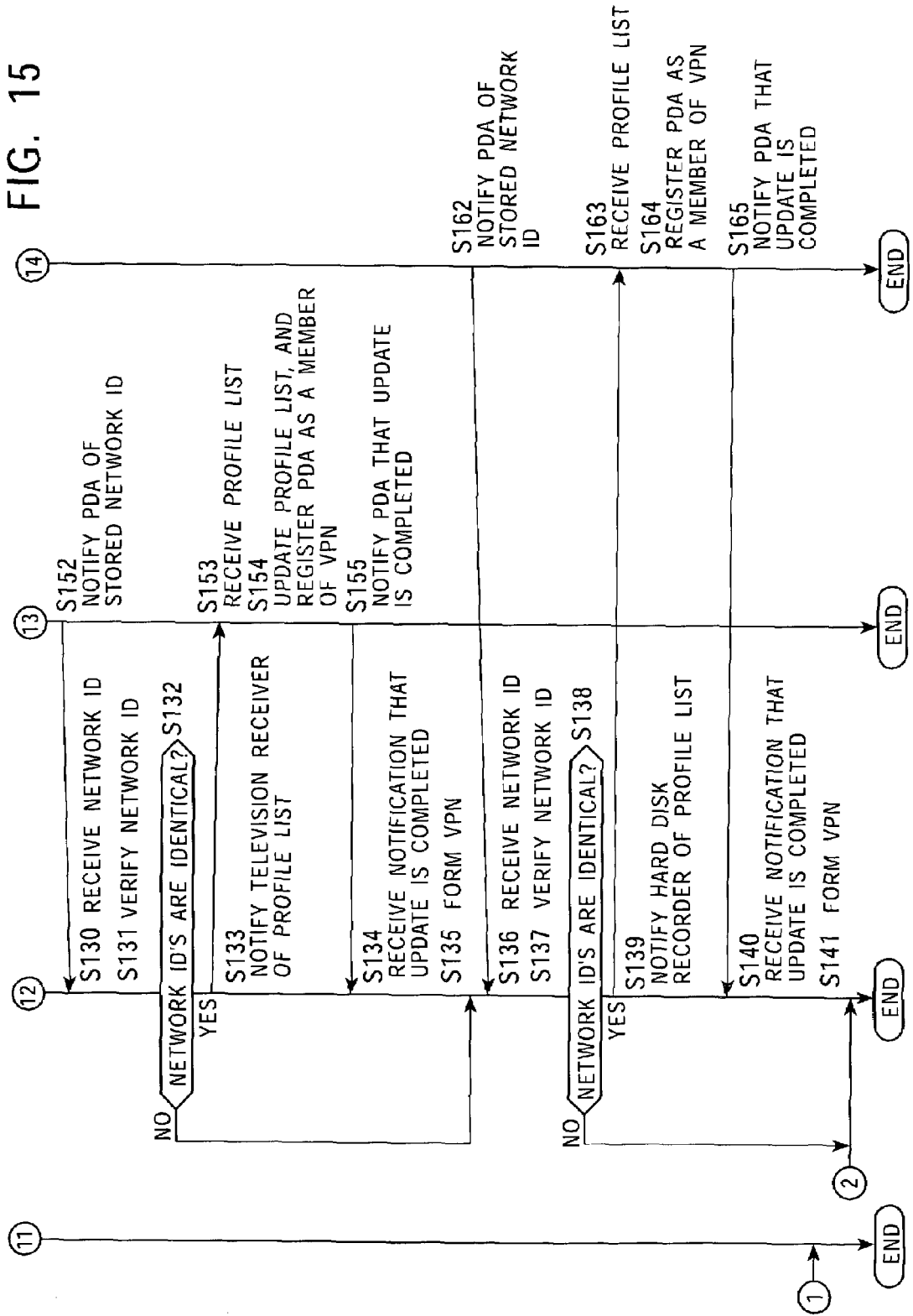
FIG. 15 is a continuation of the flow diagram of FIG. 14.

The process of adding the PDA 4 having the password set therewithin to the VPN is discussed with reference to flow diagrams shown in FIGS. 14 and 15. The process is substantially identical to the process already discussed with reference to FIG. 11. The same authentication process is performed when each of the television receiver 2 and the hard disk recorder 3 is added to the VPN.

When the reader/writer 126 notifies the CPU 121 in the PDA 4 that the IC card 1 is detected, the CPU 121 informs the IC card 1 of the profile of its own in step S121.

In step S101, the CPU 31 in the IC card 1 receives the profile from the PDA 4, and proceeds to step S102 to verify the content of the profile.

In step S103, the CPU 31 in the IC card 1 determines whether the PDA 4 is eligible for registration as a member apparatus of the VPN (formed of the television receiver 2 and the hard disk recorder 3). If it is determined that the PDA 4 is not eligible, the algorithm ends.

The user operates one of the television receiver 2 and the hard disk recorder 3, which are already registered in the VPN, to set, in the IC card 1, the IP address of an apparatus, or the hardware configuration criterion of an apparatus to inhibit the registration of that apparatus as a member for the VPN.

If "MPEG 2 DECODER" is set as a hardware configuration criterion required of an apparatus to be eligible for the VPN, the user inhibits an apparatus having no "MPEG 2 DECODER" from being added as a member apparatus for the VPN. This arrangement prevents an apparatus unable to replay a content compressed in the MPEG 2 format from being registered into the VPN if the VPN shares the content complying with the MPEG 2.

If the CPU 31 determines in step S103 that the PDA 4 is eligible as a member apparatus for the VPN, the algorithm proceeds to step S104. The CPU 31 notifies the PDA 4 that the profile has been verified (that the PDA 4 is eligible as a member apparatus for the VPN).

This notification is received by the reader/writer 126 in the PDA 4 in step S122. The CPU 121 requests the user to input the password in step S123. In step S124, the CPU 121 determines whether the input password is identical to that input in the process shown in FIG. 13, in other words, determines whether the input password is authentic.

If the CPU 121 determines in step S123 that the input password is unauthentic, the CPU 121 ends the process, else the CPU 121 proceeds to step S125. The CPU 121 notifies the IC card 1 that the input password is verified.

By authenticating a password, an apparatus which the IC card 1 approaches by chance is prevented from being automatically registered as a member apparatus for the VPN.

The notification that the password has been authenticated is received by the IC card 1 in step S105. In step S106, the CPU 31 in the IC card 1 registers the profile of the PDA 4 in the profile list.

In step S107, the CPU 31 in the IC card 1 notifies the PDA 4 of the network ID, the profile list, and a VPN encryption key stored in the EEPROM 34. When a content is shared in a formed VPN, the VPN encryption key is used to authenticate an apparatus, or to encrypt the content.

These pieces of information coming in from the IC card 1 are received by the reader/writer 126 in the PDA 4 in step S126, and are then stored in the storage unit 128 in step S127.

In step S128, the CPU 121 in the PDA 4 notifies the IC card 1 that the network ID, the profile list, and the VPN encryption key have been stored. This notification is received by the IC card 1 in step S108.

In step S129, the CPU 121 in the PDA 4 accesses the television receiver 2 and the hard disk recorder 3 in accordance with the information registered in the profile list, and requests each apparatus to send the respective stored network ID.

This request is received by the radio communication unit 57 in the television receiver 2 in step S151. In step S152, the CPU 51 in the television receiver 2 controls the radio communication unit 57, thereby transmitting the network ID stored in the storage unit 58 to the PDA 4.

The network ID transmitted from the television receiver 2 is received by the radio communication unit 127 in the PDA 4 in step S130. The CPU 121 in the PDA 4 authenticates the network ID. In step S131, the CPU 121 in the PDA 4 checks the network ID notified of by the television receiver 2 and the network ID stored in the storage unit 128, and determines in step S132 whether the two network ID's are identical.

If the CPU 121 determines in step S132 that the notified network ID is identical to the network ID of its own, the algorithm proceeds to step S133. The CPU 121 sends an updated profile list notified of by the IC card 1 to the television receiver 2 through the radio communication unit 127.

One apparatus, which was registered as a member of the VPN by the IC card 1 (when the IC card 1 has been placed close to that apparatus), is currently registered as a member of another VPN by another IC card. Such an apparatus is prevented from being registered again as a new member of the VPN by the IC card 1 by checking the network ID.

In step S153, the profile list transmitted from the PDA 4 is received by the radio communication unit 57 in the television receiver 2, and is stored in the storage unit 58. The profile list there is updated. The PDA 4 is thus added as a member of the VPN.

In step S155, the CPU 51 in the television receiver 2 notifies the PDA 4 that the updating of the profile list is completed. The algorithm ends.

In step S134, the CPU 121 in the PDA 4 receives the notification from the television receiver 2. In step S135, the CPU 121 in the PDA 4 performs a variety of settings, thereby forming a VPN with the television receiver 2. If it is determined in step S132 that the network ID transmitted from the television receiver 2 is not identical to the network ID stored in the storage unit 128, step S133 through step S135 are skipped.

In response to the request of the PDA 4 to notify the PDA 4 of the network ID, the CPU 101 in the hard disk recorder 3 performs the same process as that of the CPU 51 in the television receiver 2 in step S162 through step S165.

In step S162, the CPU 101 in the hard disk recorder 3 controls the radio communication unit 107, thereby notifying the PDA 4 of the network ID stored in the hard disk 109.

In step S136, the network ID transmitted from the hard disk recorder 3 is received by the radio communication unit 127 in the PDA 4. In step S137, the network ID is verified. In step S138, the CPU 121 in the PDA 4 determines whether the network ID transmitted from the hard disk recorder 3 is identical to the network ID stored in the storage unit 128. If it is determined that the two network ID's are not identical, the algorithm ends.

If the CPU 121 determines in step S138 that the network ID transmitted from the hard disk recorder 3 is identical to the network ID stored in the storage unit 128, the algorithm proceeds to step S139. The CPU 121 then notifies the hard disk recorder 3 of the profile list transmitted from the IC card 1.

In step S163, the profile list transmitted from the PDA 4 is received by the radio communication unit 107 in the hard disk recorder 3, and is used to update the profile list stored in the hard disk 109. In step S164, the PDA 4 is added as a member forming the VPN. In step S165, the CPU 101 in the hard disk recorder 3 notifies the PDA 4 that the updating of the profile list has been completed, and ends the process.

The CPU 121 in the PDA 4 receives the notification from the hard disk recorder 3 in step S140. In step S141, the CPU 121 performs a predetermined setting, thereby forming a VPN with the hard disk recorder 3.

By verifying the password uniquely set to each apparatus and the network ID stored in each apparatus, the user reliably forms the VPN desired by the user himself or herself. When the apparatuses communicate with each other, the network ID's thereof are mutually authenticated. A secure VPN thus results.

The user can easily and quickly form the VPN by simply placing the IC card 1 close to each apparatus. Since the above-referenced processes are carried out in response to an action such as simply placing the IC card 1 to each apparatus, the VPN is intuitively formed.

Figure 16A:
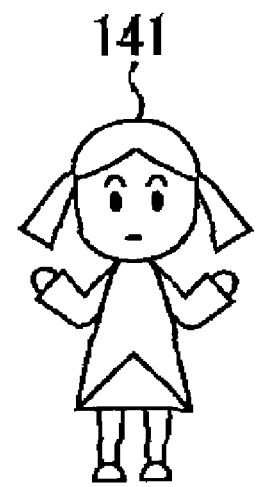
FIGS. 16A and 16B show examples of characters.

A character 141 shown in FIG. 16A is presented on the display of each apparatus forming the same VPN. The user thus easily recognizes the apparatus forming the VPN by an on-screen image.

Figure 16B:
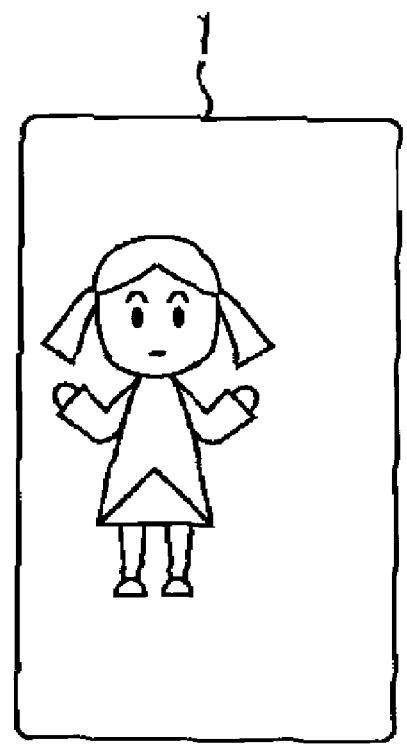

Referring to FIG. 16B, the character 141 is printed on the surface of the IC card 1, and image data of the character 141 is stored beforehand in the EEPROM 34 of the IC card 1.

When the IC card 1 is placed close to each apparatus, prepared image data, further to the network ID and the profile list, is fed to the nearby apparatus. These pieces of information are shared in common by the television receiver 2, the hard disk recorder 3, and the PDA 4.

Figure 17:
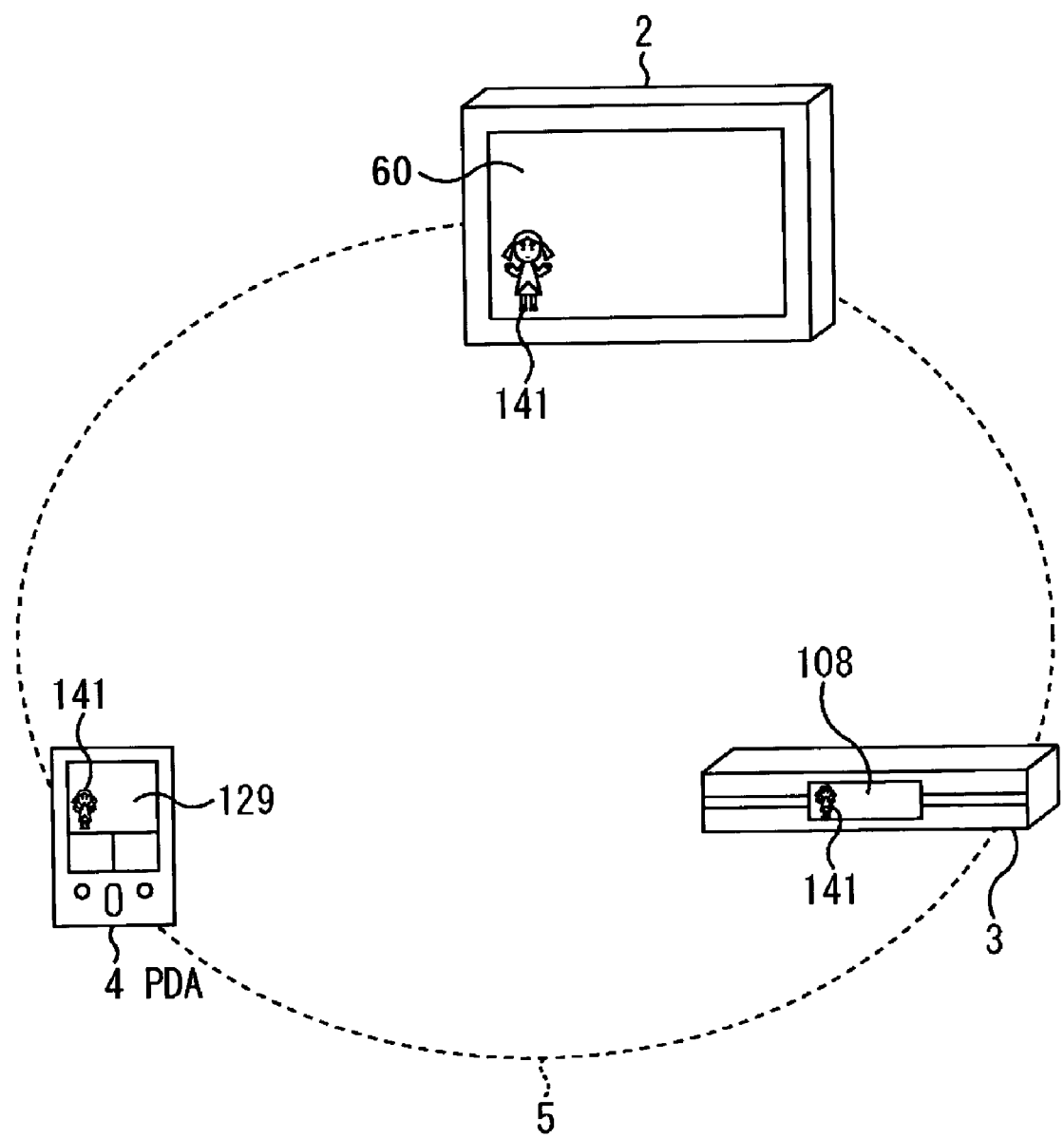
FIG. 17 shows a network system of the present invention presenting the characters shown in FIGS. 16A and 16B.

The image of the character 141 responsive to the image data is presented on the display of each apparatus. FIG. 17 shows a VPN including the apparatuses that present the character 141.

Referring to FIG. 17, the image of the character 141 stored in the IC card 1 is presented on the display of each of the display 60 in the television receiver 2, the display 108 in the hard disk recorder 3, and the LCD 129 in the PDA 4.

Even when a plurality of VPN's are located in a single room, the user easily recognizes which VPN is formed of what apparatus by checking the display of each apparatus.

When an expiration date is set in the network ID, the remaining period of the network ID to the expiration date is represented by the character 141. For example, a plurality of characters 141 having different moods are prepared for the network ID. When a substantial period of time remains before the expiration date, the image of a cheerful character 141 is presented. When a little period of time remains, the image of a cheerless character 141 is presented. In this way, the user easily knows the expiration date of the network ID.

Not only the character 141 but also mere alphanumeric letters may be presented on each apparatus to indicate the VPN to which the apparatus belongs to.

The apparatuses forming the VPN 5 are the television receiver 2, the hard disk recorder 3, and the PDA 4 in the above discussion. Furthermore, a diversity of apparatuses such as a personal computer, a mobile telephone, and a game playing machine may be included in the VPN.

If the apparatuses are linked to the Internet, a management server for managing the IP address and the hardware configuration of each apparatus, and the network ID stored in the IC card 1 may be arranged. The VPN is thus managed by the management server.

Figure 18:
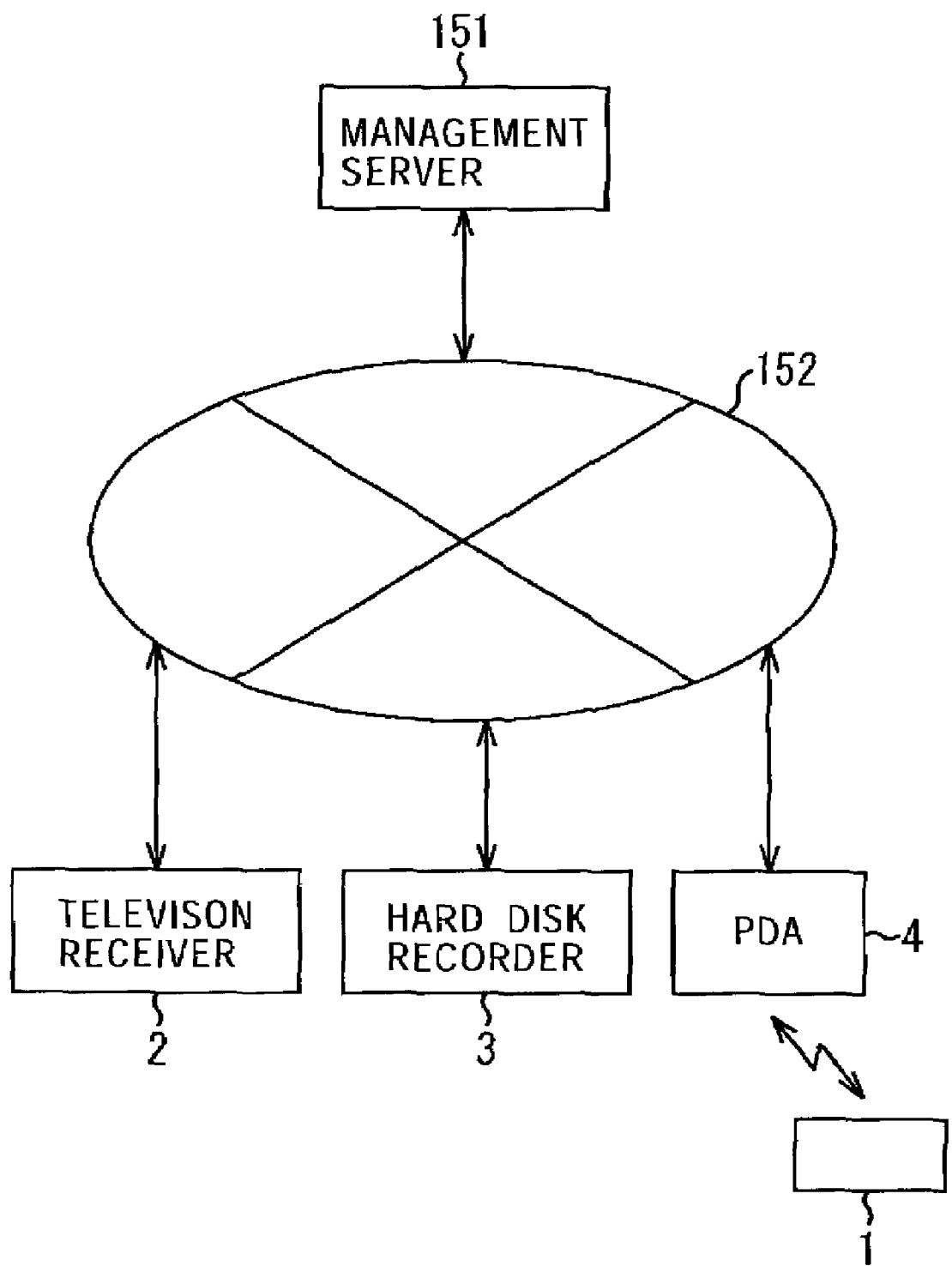
FIG. 18 shows another construction of the network system of FIG. 1.

FIG. 18 shows the concept of a network system in which the VPN is managed by a management server 151.

The management server 151 manages the IP addresses of the television receiver 2, the hard disk recorder 3, and the PDA 4 sent through a network 152. When the network ID of the IC card 1 is notified of by each apparatus, the management server 151 manages the information of the IP addresses and the network ID by associating the IP addresses with the network ID.

As shown, when the IC card 1 is placed close to the PDA 4, the PDA 4 reads the network ID of the IC card 1. The read network ID is sent together with the IP address of the PDA 4 to the management server 151 through the network 152.

The management server 151 searches for management information when the network ID comes in from the PDA 4. The management server 151 determines whether there is present an apparatus that has already notified of a network ID identical to that notified of by the PDA 4. For example, the IC card 1 has been placed close to the television receiver 2 before the IC card 1 is placed close to the PDA 4, and the network ID of the IC card 1 has already been informed by the television receiver 2. The management server 151 then notifies the PDA 4 of the IP address of the television receiver 2 while notifying the television receiver 2 of the IP address of the PDA 4 at the same time.

The PDA 4 accesses the television receiver 2 in accordance with the IP address transmitted from the management server 151, and forms a VPN with the television receiver 2.

With the management server 151 managing the apparatuses forming the VPN, the user easily forms a VPN by simply placing the IC card 1 close to each of the apparatus in the same way as already described.

The IC card uses the loop antenna to transfer power and data. Alternatively, the network ID and the profile list are shared in common by using IrDA (Infrared Data Association) or the combination of a bar code and a bar coder reader. This embodiment uses the IC card, but the present invention is not limited to the IC card. Alternatively, a module having any shape is perfectly acceptable as long as the module has the same function. The communication of the IC card is not limited to a non-contact type. The IC card communicates with each apparatus in a contact-type communication.

Each apparatus forming the VPN is identified using the IP address such as Ipv6. Any type of information is used as long as the information is unique. Even if an TP address of IPv4 is assigned to each apparatus, identification information is uniquely assigned to each apparatus in the system. A server manages the association between the identification information and the IP address dynamically assigned to the identification. The identification information is sent to the server to query the IP address. An apparatus to which the IC card is placed close identifies apparatuses forming the VPN based on the identification information, and accesses the apparatuses.

The above series of process steps are performed using hardware. Alternatively, these process steps may be performed using software programs.

When the process steps are performed using a software program, a program code forming the software program may be installed in a computer assembled into a dedicated hardware, or a program code forming the software program may be installed from a network or a program storage medium to a general-purpose personal computer which performs a variety of functions.

The program storage medium may be a package medium which may be distributed separately from the apparatus to supply the user with the software programs as shown in FIG. 6. The package medium may be the magnetic disk 132 (such as a floppy disk), the optical disk 133 (such as a CD-ROM (Compact Disk-Read Only Memory) and a DVD (Digital Versatile Disk)), the magneto-optical disk 134 (such as an MD (Mini Disk) (Trademark) or the semiconductor memory 135. The storage medium also may be the ROM 122 or the hard disk contained in the storage unit 128, each of which is supplied in the mounted state thereof in the apparatus and has a computer program stored therewithin.

It is not necessary that the process steps describing the software program to perform a diversity of processes be chronologically performed in the order stated in each flow diagram. Several process steps may be performed in parallel or separately.

In this specification, the system refers to an entire system containing a plurality of apparatuses.

What is claimed is:

1. A network system comprising an electronic device, a first communication apparatus, and a second communication apparatus,
    wherein the electronic device comprises:
        first receiver means for receiving first feature information transmitted from the first communication apparatus when the first communication apparatus detects that the electronic device is within a range of the first communication apparatus to enable communication between the electronic device and the first communication apparatus, the first feature information indicating a feature of the first communication apparatus required to form a virtual private network,
        first storage means for storing the first feature information received by the first receiver means and second feature information indicating a feature of the second communication apparatus required to form a virtual private network,
        second storage means for storing identification information, and
        first transmitter means for transmitting, to the first communication apparatus, the second feature information of the second communication apparatus and the identification information; and
    the first communication apparatus comprises:
        third storage means for storing the first feature information,
        second transmitter means for transmitting the first feature information to the electronic device,
        second receiver means for receiving the second feature information and the identification information,
        third transmitter means for establishing a connection with the second communication apparatus based on the second feature information and for transmitting the first feature information to the second communication apparatus, and
        forming means for storing the second feature information and for forming a virtual private network with the second communication apparatus.

2. A communication method of a network system comprising an electronic device, a first communication apparatus, and a second communication apparatus,
    wherein the communication method of the network system carried out by the electronic device comprises:
        receiving first feature information transmitted from the first communication apparatus when the first communication apparatus detects that the electronic device is within a range of the first communication apparatus to enable communication between the electronic device and the first communication apparatus, the first feature information indicating a feature of the first communication apparatus required to form a virtual private network,
        storing the first feature information and second feature information indicating a feature of the second communication apparatus,
        storing identification information, and
        transmitting, to the first communication apparatus, the second feature information of the second communication apparatus and the identification information; and
    the communication method of the network system carried out by the first communication apparatus comprises:
        storing the first feature information,
        transmitting, to the electronic device, the first feature information,
        receiving, from the electronic device, the second feature information and the identification information transmitted,
        transmitting the first feature information to the second communication apparatus, the second communication apparatus being connected to the first communication apparatus based on the second feature information, and
        forming a virtual private network with the second communication apparatus by storing the second feature information.

3. A communication method, comprising:
    moving an electronic device to within a range of communication to enable communication with a first communication apparatus,
    receiving, at the electronic device, first feature information transmitted from the first communication apparatus when the first communication apparatus detects that the electronic device is within a range of the first communication apparatus to enable communication between the electronic device and the first communication apparatus, the first feature information indicating a feature of the first communication apparatus required to establish a communication network including the first communication apparatus,
    storing the first feature information and second feature information indicating a feature of a second communication apparatus,
    storing identification information, and
    transmitting, to the first communication apparatus, the second feature information and the identification information.

4. A storage medium storing a computer readable program, the computer readable program configured to perform a method comprising:
controlling reception, by an electronic device, of first feature information transmitted from a first communication apparatus when the first communication apparatus detects that the electronic device is within a range of the first communication apparatus to enable communication between the electronic device and the first communication apparatus, the first feature information indicating a feature of the first communication apparatus required to establish a communication network including the first communication apparatus,
controlling acquisition of the stored first feature information and of the stored second feature information indicating a feature of a second communication apparatus,
controlling acquisition of stored identification information, and
controlling transmission, to the communication apparatus, of the second feature information and the identification information.

5. A first communication apparatus comprising:
storage means for storing first feature information indicating a feature of the first communication apparatus required to establish a communication network including the first communication apparatus,
first transmitter means for transmitting the first feature information to an electronic device when the first communication apparatus detects that the electronic device is within a range of the first communication apparatus to enable communication between the electronic device and the first communication apparatus,
receiver means for receiving, from the electronic device, second feature information indicating a feature of a second communication apparatus and identification information identifying the electronic device,
second transmitter means for establishing a connection with the second communication apparatus based on the second feature information and for transmitting the first feature information to the second communication apparatus, and
forming means for storing the second feature information and for forming a virtual private network with the second communication apparatus.

6. A first communication apparatus according to claim 5, wherein the first feature information includes an IP address of the first communication apparatus, and
wherein the second feature information includes an IP address of the second communication apparatus.

7. A first communication apparatus according to claim 5, further comprising display means for displaying a predetermined image based on image data received by the receiver means.

8. A first communication apparatus according to claim 5, wherein the receiver means receives, from the electronic device, an encryption key, the encryption key being used in communication over the virtual private network.

9. A first communication apparatus according to claim 5, wherein:
the first feature information includes information relating to the hardware configuration of the first communication apparatus, and
the second feature information includes information relating to the hardware configuration of the second communication apparatus.

10. A communication method, comprising:
storing first feature information indicating a feature of a first communication apparatus required to establish a communication network including the first communication apparatus,
transmitting the first feature information to an electronic device when the first communication apparatus detects that the electronic device is within a range of the communication apparatus to enable communication between the electronic device and the first communication apparatus,
receiving, from the electronic device, second feature information indicating a feature of a second communication apparatus and identification information identifying the electronic device,
transmitting the first feature information to the second communication apparatus, the second communication apparatus being connected to the first communication apparatus based on the second feature information; and
forming a virtual private network with the second communication apparatus by storing the second feature information.

11. A storage medium storing a computer readable program, the computer readable program configured to perform a method comprising:
controlling acquisition of stored first feature information indicating a feature of a first communication apparatus,
controlling transmission to an electronic device of the first feature information when the first communication apparatus detects that an electronic device is within a range of the first communication apparatus to enable communication between the electronic device and the first communication apparatus,
controlling reception of second feature information indicating a second communication apparatus and identification information identifying the electronic device, transmitted from the electronic device,
controlling transmission of the first feature information to the second communication apparatus, the second communication apparatus being connected to the first communication apparatus based on the second feature information received in the reception control step, and
controlling formation of a virtual private network with the second communication apparatus by controlling the storage of the second feature information.

12. A computer readable medium comprising instructions which, when executed by a processor, perform a method comprising:
Controlling acquisition of stored first feature information indicating a feature of a first communication apparatus,
controlling transmission to an electronic device of the first feature information,
controlling reception, from the electronic device, of second feature information indicating a second communication apparatus and identification information identifying the electronic device,
controlling transmission of the first feature information to the second communication apparatus, the second communication apparatus being connected with the first communication apparatus based on the second feature information, when the second communication apparatus detects that the electronic device is within a range of the second communication apparatus to enable communication between the electronic device and the second communication apparatus, and
controlling formation of a virtual private network with the second communication apparatus by controlling the storage of the second feature information.

* * * * *